(12) United States Patent
Omori

(10) Patent No.: US 11,079,992 B2
(45) Date of Patent: Aug. 3, 2021

(54) INFORMATION PROCESSING APPARATUS HAVING SOFTWARE KEY DISPLAY, CONTROL METHOD THEREOF, AND PROGRAM

(71) Applicant: CANON KABUSHIKI KAISHA, Tokyo (JP)

(72) Inventor: Seiya Omori, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/433,048

(22) Filed: Jun. 6, 2019

(65) Prior Publication Data
US 2020/0034097 A1    Jan. 30, 2020

(30) Foreign Application Priority Data
Jul. 25, 2018    (JP) .............................. JP2018-139575

(51) Int. Cl.
G06F 3/12    (2006.01)
H04N 1/00    (2006.01)

(52) U.S. Cl.
CPC .......... *G06F 3/1273* (2013.01); *G06F 3/1205* (2013.01); *G06F 3/1259* (2013.01); *H04N 1/00411* (2013.01); *H04N 1/00472* (2013.01); *H04N 1/00474* (2013.01); *H04N 1/00501* (2013.01)

(58) Field of Classification Search
CPC ........... H04N 1/00472; H04N 1/00474; H04N 1/00501–00517; H04N 1/00411; G06F 3/1273
See application file for complete search history.

(56) References Cited

U.S. PATENT DOCUMENTS

| | | | |
|---|---|---|---|
| 2009/0198838 A1* | 8/2009 | Murata | H04N 1/00411 710/8 |
| 2010/0290068 A1* | 11/2010 | Okada | G03G 15/50 358/1.9 |
| 2013/0050731 A1* | 2/2013 | Fukuoh | H04N 1/00482 358/1.13 |
| 2014/0019914 A1* | 1/2014 | Amano | G06F 3/0481 715/825 |

(Continued)

FOREIGN PATENT DOCUMENTS

JP    2016-154383 A    8/2016

*Primary Examiner* — Nicholas Pachol
(74) *Attorney, Agent, or Firm* — Venable LLP

(57) ABSTRACT

An information processing apparatus displays a first job setting screen for a user to perform a setting when a predetermined job is executed by a first application and a second job setting screen for the user to perform a setting when the predetermined job is executed by a second application, displays a menu screen including the first application's software key and the second application's software key and one or a plurality of job histories having information regarding the application selection information, and receives designation of any of the job histories by the user. Whether an application corresponding to the information regarding the application selection information included in the designated job history is the first application or the second application is specified, and the first job setting screen or the second job setting screen, which corresponds to the specified application, is displayed.

20 Claims, 14 Drawing Sheets

(56) References Cited

U.S. PATENT DOCUMENTS

| | | | |
|---|---|---|---|
| 2015/0222770 A1* | 8/2015 | Yoshida | H04N 1/00389 358/1.15 |
| 2016/0117178 A1* | 4/2016 | Amano | H04N 1/00408 715/708 |
| 2017/0075554 A1* | 3/2017 | Sasayama | H04N 1/0044 |
| 2018/0220015 A1* | 8/2018 | Akuzawa | H04N 1/00482 |
| 2019/0012056 A1* | 1/2019 | Kamoi | H04N 1/00424 |
| 2019/0245989 A1* | 8/2019 | Yoshida | G06F 3/1204 |
| 2019/0297207 A1* | 9/2019 | Amano | G06F 9/453 |
| 2019/0306349 A1* | 10/2019 | Shino | H04N 1/00517 |
| 2019/0379799 A1* | 12/2019 | Shogaki | H04N 1/00477 |

* cited by examiner

FIG. 6

| key | value |
|---|---|
| job.type | send |
| job.date | 2018/6/19 |
| job.application | simple_send |
| job.data.color | color |
| job.data.filetype | pdf |
| job.data.destination[0] | taro.kawasaki@mail.com |
| job.data.destination[1] | hanako.kangawa@mail.com |
| job.data.scanplex | one_side |
| job.data.resolution | 300 |
| ... | ... |

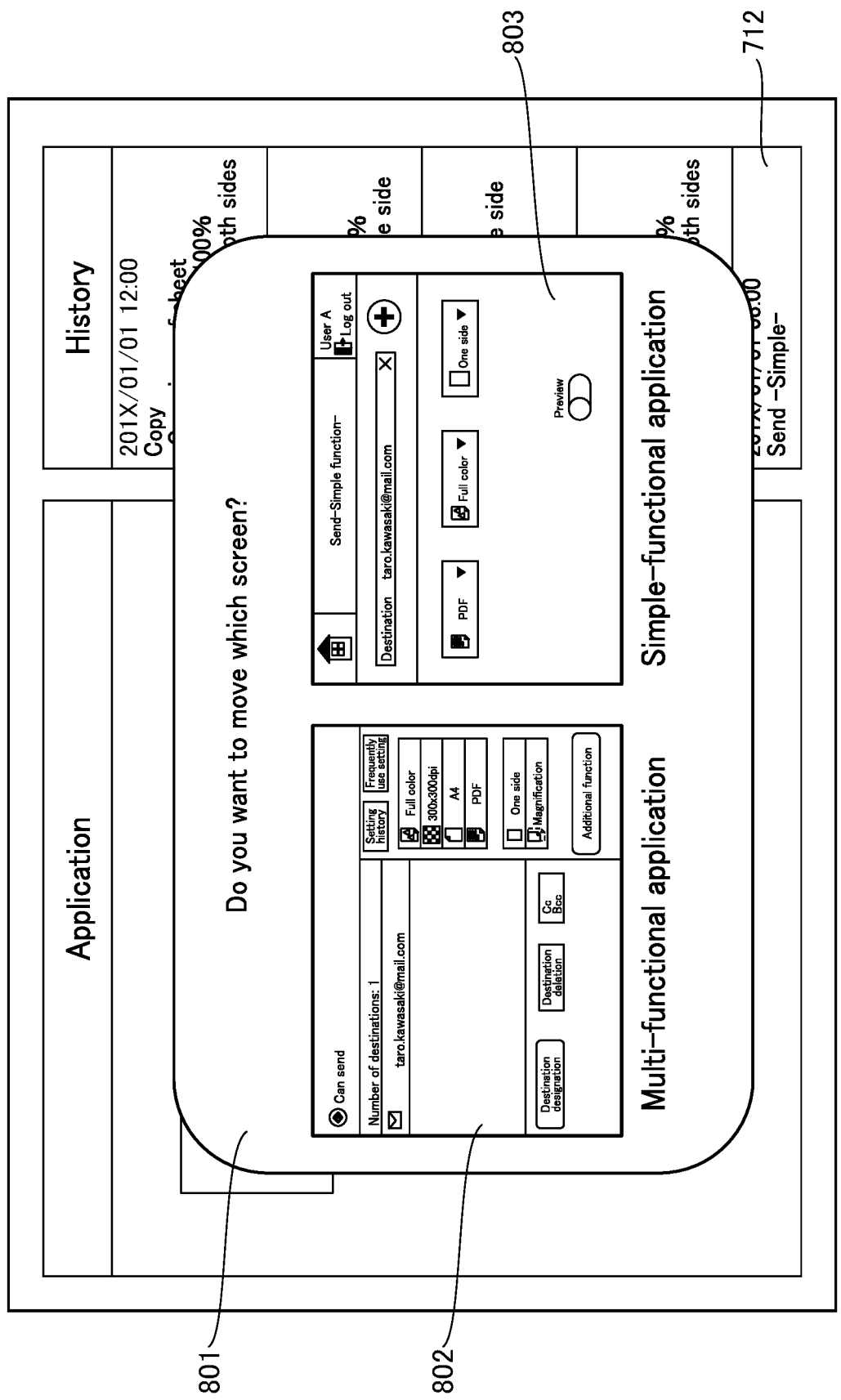

INFORMATION PROCESSING APPARATUS HAVING SOFTWARE KEY DISPLAY, CONTROL METHOD THEREOF, AND PROGRAM

BACKGROUND OF THE INVENTION

Field of the Invention

The present invention relates to an information processing apparatus, a control method thereof, and a program.

Description of the Related Art

In recent years, image processing apparatuses such as a multifunctional printer (MFP) have become multifunctional. For example, users can perform various settings for copy jobs, facsimile transmission jobs and the like, thereby obtaining various outputs of these jobs. By developing such multi-functionality, it is possible to provide image processing apparatuses capable of handling user's more detailed needs. On the other hand, multi-functionality of image processing apparatuses, for example, may cause job settings to be complex when various job outputs are performed by a user who does not desire various job settings.

In this regard, Japanese Patent Laid-Open No. 2016-154383 proposes a technology capable of allowing arbitrary selection, as an application for a user interface (UI), of either one of a multi-functional application for performing a normal job setting and a simple-functional application capable of performing only a part of the job setting. According to the technology, the needs of users who desire various job settings can be satisfied by selecting the multi-functional application and performing detailed job settings. On the other hand, the complexity of a job setting for users who do not desire various job settings can be eliminated and usability can be improved by selecting the simple-functional application.

Japanese Patent Laid-Open No. 2016-154383 discloses a technology of displaying a selecting part for selecting the multi-functional application or the simple-functional application on the same screen. In such a case, for one job, a case of executing the job with the multi-functional application and a case of executing the job with the simple-functional application are assumed. However, Japanese Patent Laid-Open No. 2016-154383 does not consider how to manage a job history (a timeline) in these two cases. Accordingly, when a certain user has executed a copy job using the multi-functional application, if an image processing apparatus simply manages a job history as "copy", users who desire to execute the copy job from the job history may be inconvenienced.

For example, in an image processing apparatus available to a plurality of users, if a user executes a copy job on the basis of a job history without utilizing an authentication function, the job histories of various jobs of the plurality of users are displayed on a display. However, since the job history of the copy job does not include information for specifying whether the copy job has been executed with the multi-functional application or the simple-functional application, the user is not able to appropriately select a copy job to be called by the user.

SUMMARY OF THE INVENTION

An objective of the present invention is to improve the convenience of users, who desire to execute a job from a job history, by including information for specifying an application having executed a predetermined job from an application group in an information processing apparatus capable of executing the same job by selectively using at least two applications.

An information processing apparatus according to an embodiment of the present invention includes an operation unit receiving an operation of a user, and a control unit controlling a job setting screen, which is displayed on the operation unit, by selectively using one of first and second applications capable of executing the same job. The control unit includes a management unit managing, if a job has been executed, a job history having information indicating whether the job has been executed by the first application or the second application, a first display unit displaying a menu screen including the job history having the information on the operation unit in a state in which the job history can be selected, a selection unit selecting one of the first application and the second application on the basis of the information if the job history having the information is selected on the menu screen, and a second display unit displaying the job setting screen on the operation unit by using one of the first application and the second application, which is selected by the selection unit.

According to the present invention, in an information processing apparatus capable of executing the same job by selectively using at least two applications, information for specifying an application having executed a predetermined job is included in a job history, so that it is possible to improve the convenience of users who desire to execute a job from the job history.

Further features of the present invention will become apparent from the following description of exemplary embodiments with reference to the attached drawings.

BRIEF DESCRIPTION OF THE DRAWINGS

FIG. 6 is a diagram illustrating an example of a job history information table associated with a job history.

FIG. 9 is a diagram illustrating an example of displaying a screen for confirming an application that performs a job setting after the selection of a job history.

DESCRIPTION OF THE EMBODIMENTS

An embodiment of the present invention will be described below with reference to appended drawings.

An embodiment to be described below is applicable to an information processing apparatus, such as a personal computer, a PDA, a cellular phone, a FAX, a camera, a video camera, and an electronic device having an image viewer function, in addition to an image processing apparatus such as a MFP. Hereinafter, in order to simplify a description, an image processing apparatus having a plurality of functions such as a copy function and a scanner function will be described as an example. Furthermore, it goes without saying that the present invention is also applicable even when the image processing apparatus or the information processing apparatus has one function.

(Image Processing Apparatus)

Figure 1:
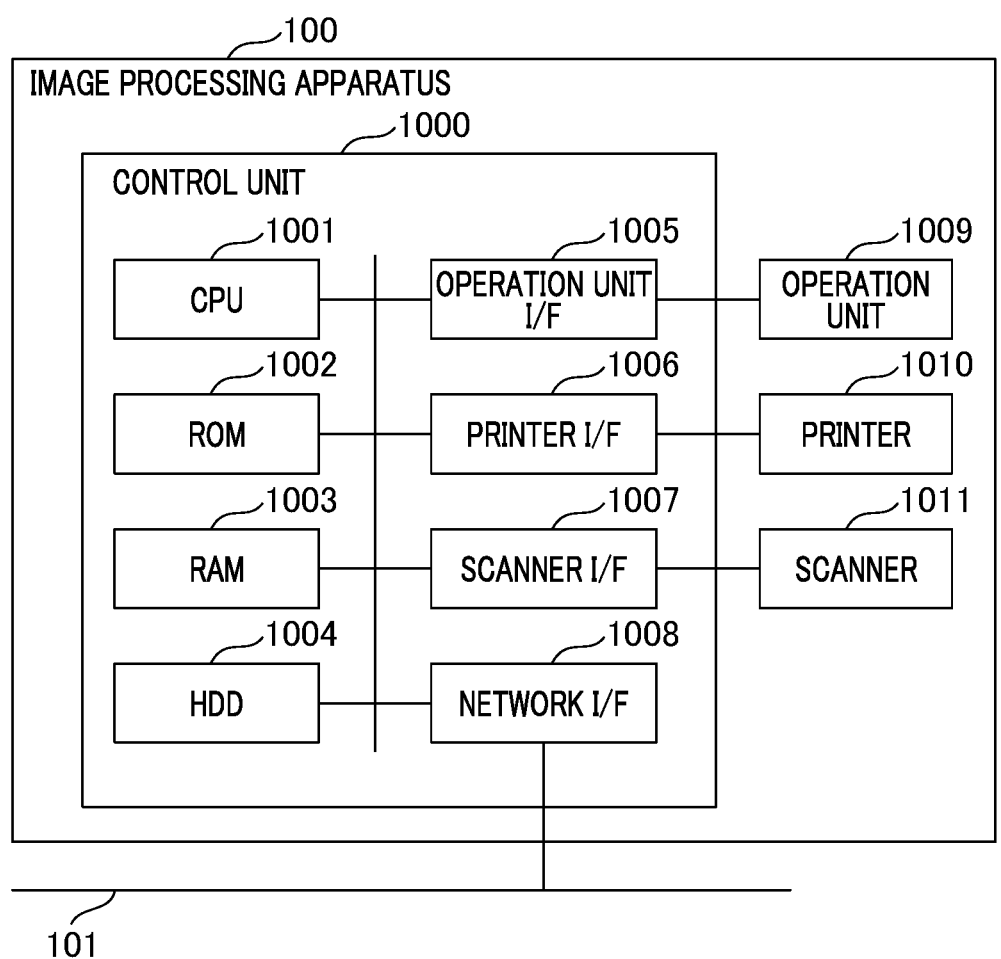
FIG. 1 is a diagram illustrating an example of a hardware configuration of an image processing apparatus.

FIG. 1 illustrates an example of a hardware configuration of an image processing apparatus.

An image processing apparatus 100 includes a control unit 1000, an operation unit 1009, a printer 1010, and a scanner 1011. Furthermore, the control unit 1000 includes a CPU 1001, a ROM 1002, a RANI 1003, a HDD 1004, an operation unit interface (I/F) 1005, a printer I/F 1006, a scanner I/F 1007, and a network I/F 1008.

The control unit 1000 controls operations of the image processing apparatus 100.

The present embodiment has a particular operation for controlling a job setting screen displayed on the operation unit 1009 by selectively using one of a first application and a second application, among the operations controlled by the control unit 1000. The first application, for example, is a multi-functional application capable of performing predetermined job settings on a job setting screen, and the second application, for example, is a simple-functional application capable of performing only a part of the predetermined job settings on the job setting screen.

In this regard, the first application and the second application are limited to applications related to the same job ("copy", "scan and send", and the like) in the present invention. Furthermore, it is sufficient if the number of applications capable of executing the same job (including a job setting) is at least 2.

Hereinafter, a general configuration and operation of the image processing apparatus 100 will be described, and then an example of an operation for controlling a job setting screen displayed on the operation unit 1009 by selectively using one of the first application and the second application will be described.

The CPU 1001 reads a control program stored in the ROM 1002 to the RAM 1003. On the basis of the control program read from the ROM 1002, the CPU 1001 performs various types of control such as reading control, send control and the like for image data.

The ROM 1002, for example, is a boot ROM and stores a system boot program.

The RAM 1003 is used as a temporary storage area such as a main memory and a work area of the CPU 1001.

The HDD 1004 stores image data, various programs, various information tables and the like.

The operation unit I/F 1005 is an interface for performing communication between the operation unit 1009 and the control unit 1000.

The operation unit 1009 includes a display (for example, a liquid crystal display) having a touch panel function, a keyboard, buttons for receiving a job execution command, and the like.

In the following description, the keyboard and the buttons are assumed to be configured by hardware; however, the keyboard and the buttons may be a software keyboard or button displayed on a display having a touch panel function.

The printer I/F 1006 is an interface for performing communication between the printer 1010 and the control unit 1000. Image data to be printed in the printer 1010 is transmitted from the printer I/F 1006 of the control unit 1000 to the printer 1010.

On the basis of the image data from the control unit 1000, the printer 1010 prints the image data on a recording medium (e.g. a paper).

The scanner I/F 1007 is an interface for performing communication between the scanner 1011 and the control unit 1000.

The scanner 1011 generates image data by reading a document placed on a reading unit of the image processing apparatus by using an imaging element such as a CCD and a CMOS image sensor. The image data generated in the scanner 1011 is transmitted to the scanner I/F 1007 of the control unit 1000 and is temporarily stored in the RAM 1003.

The network I/F 1008 is an interface for performing communication between the control unit 1000 and a LAN 101. That is, the network I/F 1008 transmits various types of information to external devices connected to the LAN 101 or receives various types of information from the external devices.

Examples of the type of a job executable by the image processing apparatus 100, that is, functions (applications) provided by the image processing apparatus 100 are as follows.

"Copy" function The "Copy" function is a function in which the printer 1010 prints image data generated by the scanner 1011.

"Print" function

The "print" function is a function of printing image data with the printer 1010 on the basis of a print job transmitted from an information processing apparatus such as a PC connected to the LAN 101 to the image processing apparatus 100 via the network I/F 1008.

"Scan and send" function

The "Scan and send" function is a function of transmitting the image data generated by the scanner 1011 from the image processing apparatus 100 to an external device connected to the LAN 101.

"Scan and storage" function

The "Scan and storage" function is a function of storing the image data generated by the scanner 1011 in the HDD 1004.

"Use of stored file" function

The "Use of stored file" function is a function of printing the image data stored in the HDD 1004 with the printer 1010 or transmitting the image data to an external device via the network I/F 1008.

Among the aforementioned functions (applications), a target application of the present embodiment is an application expected to improve user's convenience by enabling the display of different job setting screens according to a user's selection with respect to the same job. For example, according to the aforementioned "copy" function, it is possible to selectively display a plurality of job setting screens, so that it is possible to improve convenience for both users who desire various job settings and users who do not desire various job settings. Similarly, according to the aforementioned "scan and send" function, it is possible to selectively display a plurality of job setting screens, so that it is possible to improve convenience for both users who desire various job settings and users who do not desire various job settings.

Hereinafter, as representative examples of the target application of the present embodiment, the "copy" function and the "scan and send" function will be described in detail.

Figure 2:
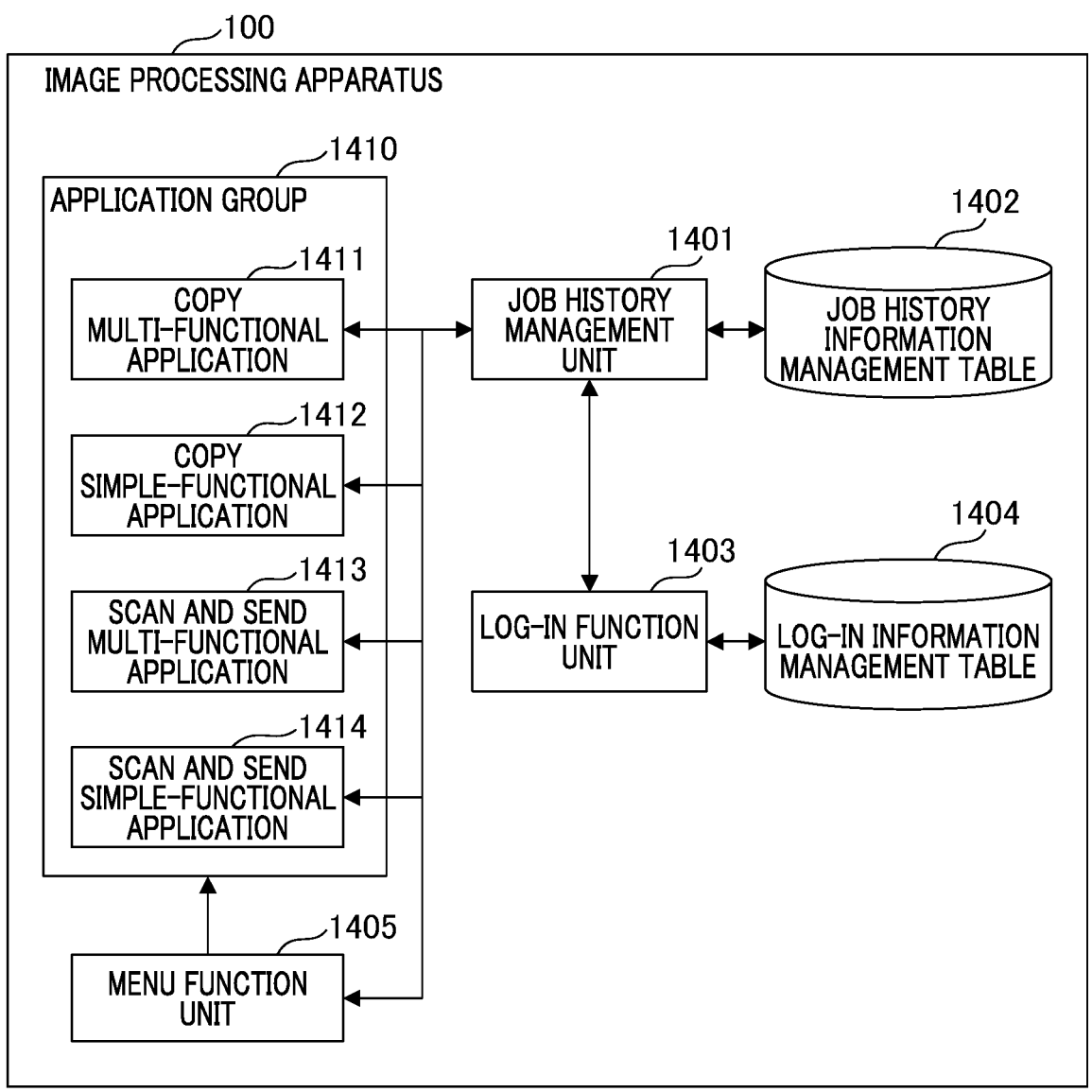
FIG. 2 is a diagram illustrating an example of a software configuration of an image processing apparatus.

FIG. 2 illustrates an example of a software configuration of the image processing apparatus.

Each piece of software is stored in the ROM 1002 and is executed by the CPU 1001.

An application group 1410 includes a plurality of applications for instructing the image processing apparatus 100 to execute a job. For example, the application group 1410 includes a copy multi-functional application 1411 and a copy simple-functional application 1412 as applications for instructing the image processing apparatus 100 to execute a "copy job". Furthermore, the application group 1410 includes a scan-and-send multi-functional application 1413 and a scan-and-send simple-functional application 1414 as applications for instructing the image processing apparatus 100 to execute a "scan and send" job.

The copy multi-functional application 1411 and the scan-and-send multi-functional application 1413 correspond to the aforementioned first application, and the copy simple-functional application 1412 and the scan-and-send simple-functional application 1414 correspond to the aforementioned second application.

The application group 1410 may include any applications, other than the applications illustrated in the drawing, if they are applications expected to improve user's convenience by enabling different job setting screens to be selectively displayed for the same job.

The copy multi-functional application 1411 and the copy simple-functional application 1412 are applications that respectively make the image processing apparatus 100 perform the "copy" function. However, job settings which can be performed in the copy simple-functional application 1412 are a part of job settings which can be performed in the copy multi-functional application 1411. That is, some of the functions (job settings) which can be performed in the copy multi-functional application 1411 are restricted in the copy simple-functional application 1412. However, the functions limited in the copy simple-functional application 1412 are unnecessary functions for users who do not desire various job settings. In other words, some of the functions are limited for users who do not desire various job settings, resulting in the improvement of convenience when performing "copy".

The scan-and-send multi-functional application 1413 and the scan-and-send simple-functional application 1414 are applications that respectively allow the image processing apparatus 100 to perform the "scan and send" function. However, job settings which can be performed in the scan-and-send simple-functional application 1414 are a part of job settings which can be performed in the scan-and-send multi-functional application 1413. That is, some of the functions (job settings) which can be performed in the scan-and-send multi-functional application 1413 are limited in the scan-and-send simple-functional application 1414. However, similarly to the aforementioned "copy", the functions limited in the scan-and-send simple-functional application 1414 are unnecessary functions for users who do not desire various job settings. In other words, some of the functions are limited for users who do not desire various job settings, resulting in an improvement in convenience when performing the "scan and send".

A job history management unit 1401 manages the history of the functions (jobs) of the image processing apparatus 100 performed by the applications included in the application group 1410. In the present embodiment, the job history has information for specifying the application having executed the job from the application group 1410. The job history is stored in a storage unit as a job history information management table 1402. The job history management unit 1401 acquires log-in information of users from a log-in function unit 1403 and manages the job history information management table 1402 for each user. That is, the job history information management table 1402 is managed in the image processing apparatus 100 as job history information associated with the users.

For example, if the job history management unit 1401 manages the job history of a plurality of users, the job history information management table 1402 includes a plurality of job history information tables 500 corresponding to the plurality of users. An example of each job history information table 500 is illustrated in FIG. 6. Details of the job history information table 500 will be described below.

However, the job history information management table 1402 does not include a plurality of job history information tables 500 having the same content (internal items are completely the same). That is, in the plurality of job history information tables 500 of the job history information management table 1402, one or more of the internal items are different from each other. In the present embodiment, the job history information table 500 includes an application name 505 having executed a job as one of the internal items.

The log-in function unit 1403 performs an authentication process of the image processing apparatus 100. The authentication function of the image processing apparatus 100, for example, includes a function of confirming whether a user has an authority to execute a job, and determining whether to permit the execution of the job on the basis of the confirmation result. Furthermore, the authentication function of the image processing apparatus 100 also performs management and the like of a display language to be displayed on the operation unit 1009 of the image processing apparatus 100 for each user having the authority to execute a job.

A log-in information management table 1404 stores information to be managed individually for each authentication user, such as an ID and a password of an authentication user. The information to be managed for each authentication user, for example, includes display language information of a user, authority information for executing a job, and the like. The information to be managed for each authentication user is not limited thereto.

A menu function unit 1405 controls a menu screen that is displayed on the operation unit 1009. In the present embodiment, the menu screen displays a job history including at least predetermined information managed by the job history management unit 1401, and a user can select any job history. The predetermined information indicates information for specifying an application having executed a job from the application group 1410. Furthermore, in order to allow a user to select any job history, for example, it is sufficient if the job history is displayed on a display having a touch panel function.

Figure 5:
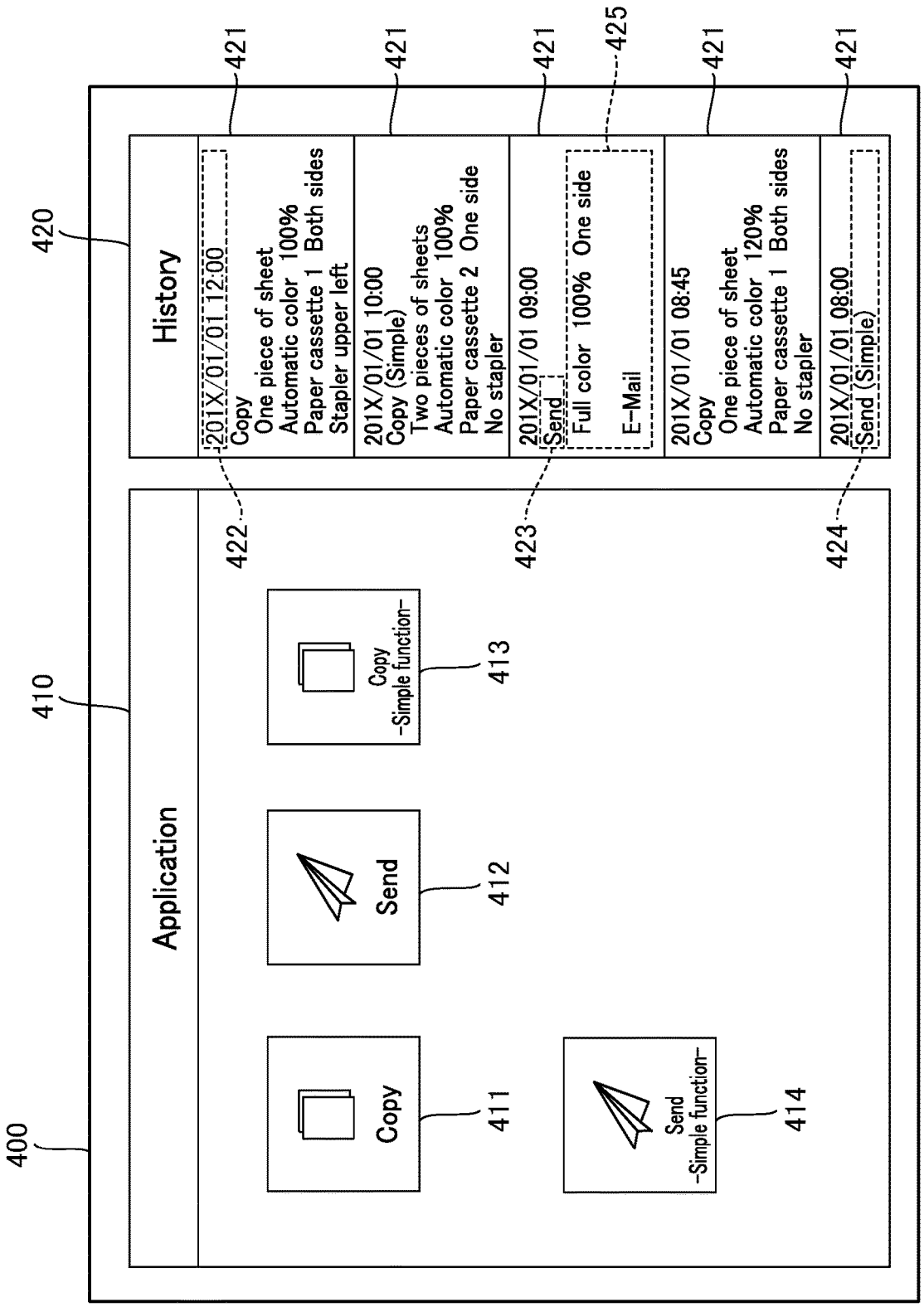
FIG. 5 is a diagram illustrating an example of a menu screen for selecting a job history and various applications.

For example, as illustrated in FIG. 5 to be described below, a menu screen 400 includes a job history display area 420 for displaying the job histories containing the predetermined information, and an application display area 410 for displaying buttons 411 to 414 for selecting an application. A user can select the multi-functional application or the simple-functional application for executing a desired job ("copy", "scan and send", and the like) by pressing any one of the displayed buttons 411 to 414.

Figure 8:
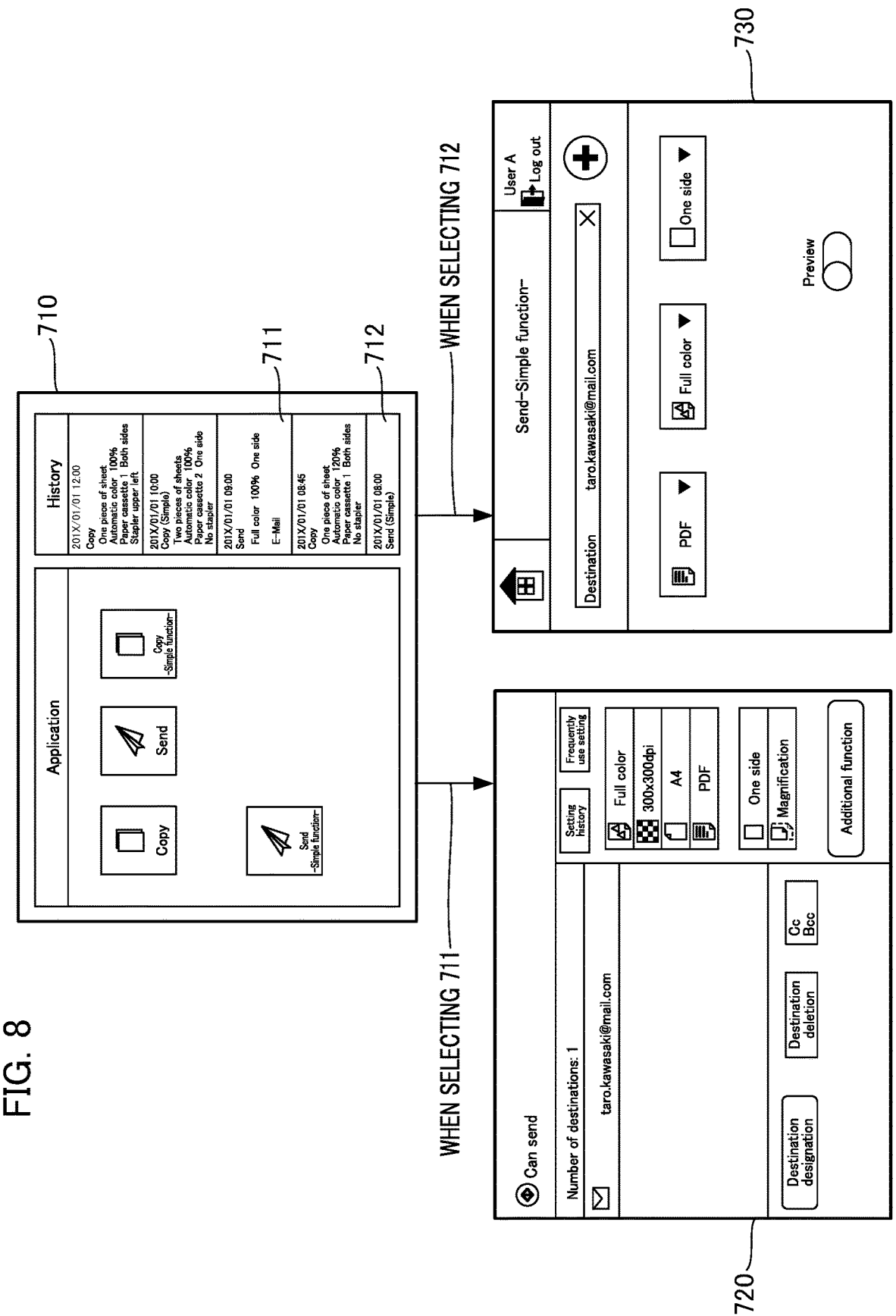
FIG. 8 is a diagram illustrating an example of a screen displayed on an operation unit on the basis of the selection of a job history.

Furthermore, the menu function unit 1405 controls the switching of the menu screen that is displayed on the operation unit 1009. For example, screen transition illustrated in FIG. 8 is controlled by the menu function unit 1405.

(Example of Screen to be Displayed on Operation Unit by Multi-Functional Application)

Figure 3:
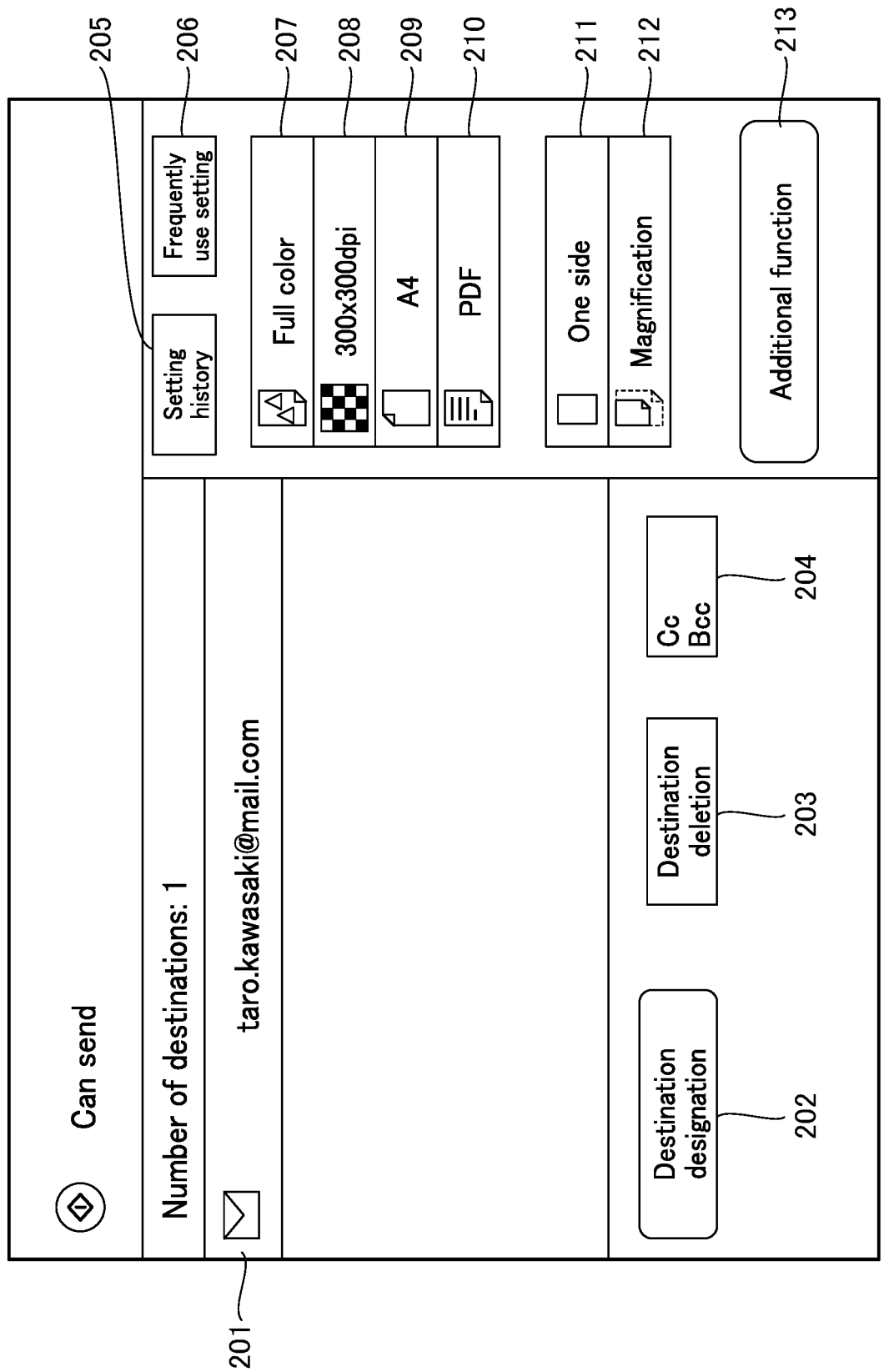
FIG. 3 is a diagram illustrating an example of a screen displayed on an operation unit by a multi-functional application.

FIG. 3 illustrates an example of a job setting screen to be displayed on the operation unit 1009 by the multi-functional application.

Hereinafter, as an example, a job setting screen to be displayed on the operation unit 1009 by using the "scan and send" multi-functional application 1413 will be described.

A destination list 201 is a list of send destinations. In FIG. 3, the number of destinations registered in the destination list 201 is 1. This means that the number of send destinations of an E-mail is 1. However, the number of destinations may be plural.

A "destination designation" button 202 is a button for adding a send destination to the destination list 201. When a user presses the "destination designation" button 202, an address book stored in the HDD 1004 of the image processing apparatus 100 is displayed on the display device of the operation unit 1009 for example. The user can add a send destination to the destination list 201 by selecting a destination from the address book. Furthermore, if there is no destination to be added to the address book, the user can also add a send destination to the destination list 201 by directly inputting the send destination to the destination list 201.

A destination deletion button 203 is a button for unregistering the send destination registered in the destination list 201. A Cc/Bcc button 204 is a button for adding a send destination as "CC" or "Bcc" of an E-mail, not adding a send destination as "To" of the E-mail. A "setting history" button 205 is a button for referring to the setting history of the "scan and send" job executed up to now. A user can not only refer to the setting history of a job from the "setting history" button 205, but also call up the setting history.

A "frequently used setting" button 206 is a button for registering or calling up a job setting by a user. When the job setting is registered by the "frequently used setting" button 206, since a user does not need to perform the job setting every time, the complexity of an operation is eliminated.

A color setting button 207 is a button for setting a color when scanning a document. A color setting of the color setting button 207, for example, is full color.

A resolution setting button 208 is a button for setting a resolution when scanning a document. A resolution setting of the resolution setting button 208, for example, is 300×300 dpi.

A document size setting button 209 is a button for designating the size of a document to be scanned. A document size of the document size setting button 209, for example, is A4 size.

A file format setting button 210 is a button for setting a file format of image data of a scanned document. The file format, for example, can be set by designating PDF.

A both-sided document setting button 211 is a button for setting whether to scan only one side or both sides of a document. In the example of FIG. 3, the setting of the both-sided document setting button 211 is "one side".

A magnification setting button 212 is a button for changing a magnification for image data of a scanned document and thus changing the size of the image data. The magnification setting of the magnification setting button 212, for example, is 100% (no change in size).

An additional function button 213 is a button for performing settings other than the settings with the aforementioned buttons 207 to 212. For example, when a user presses the additional function button 213, the screen illustrated in FIG. 3, for example, is transitioned to a screen for setting scan density, setting whether to display a preview of the image data of a scanned document, or editing the file name of image data to be transmitted.

(Example of Screen to be Displayed on Operation Unit by Single-Functional Application)

Figure 4:
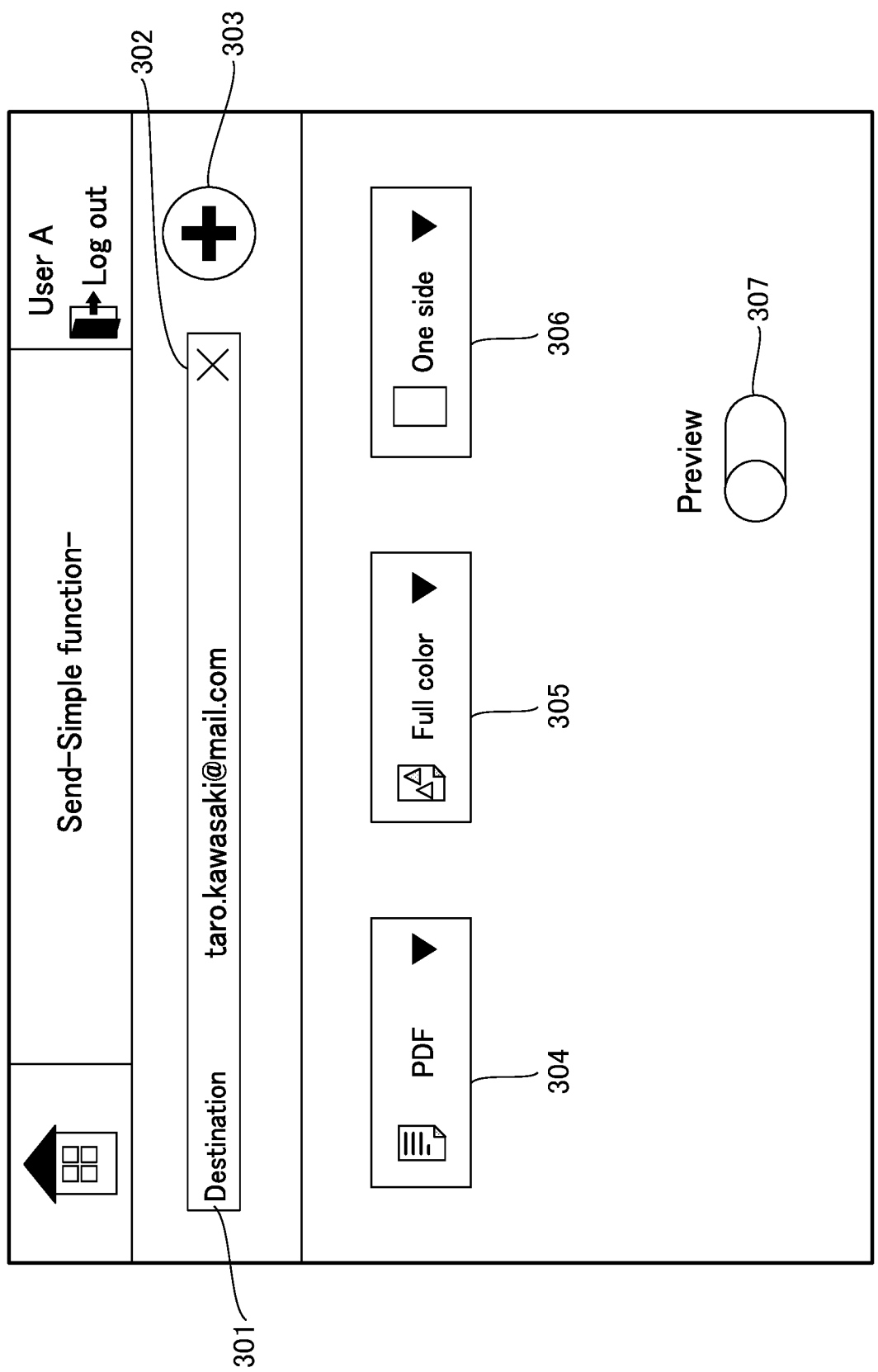
FIG. 4 is a diagram illustrating an example of a screen displayed on an operation unit by a simple-functional application.

FIG. 4 illustrates an example of a screen to be displayed on the operation unit 1009 by the single-functional application.

Hereinafter, as an example, a job setting screen to be displayed on the operation unit 1009 by using the "scan and send" single-functional application 1414 will be described.

A destination list 301 is a list of send destinations. In FIG. 4, the number of destinations registered in the destination list 301 is 1. This means that the number of send destinations of an E-mail is 1. However, the number of destinations may be plural.

A destination deletion button 302 is a button for unregistering the send destination registered in the destination list 301.

A destination designation button 303 is a button for adding a send destination to the destination list 301. When a user presses the destination designation button 303, the address book stored in the HDD 1004 of the image processing apparatus 100 is displayed on the display device of the operation unit 1009 for example. The user can add a send destination to the destination list 301 by selecting a destination from the address book. Furthermore, if there is no destination to be added to the address book, the user can also add a send destination to the destination list 301 by directly inputting the send destination to the destination list 301.

A file format setting button 304 is a button for setting a file format of image data obtained by scanning a document. The file format selectable by the file format setting button 304, for example, is PDF.

A color setting button 305 is a button for setting a color when scanning a document. The color setting selectable by the color setting button 305, for example, is full color.

A both-sided document setting button 306 is a button for setting whether to scan only one side or both sides of a document. In the example of FIG. 4, the setting of the both-sided document setting button 306 is "one side".

A preview switch 307 is a switch for setting whether to perform preview displaying of image data of the scanned document. When the preview switch is turned on, it is possible to preview the image data of the scanned document after the scanning process and thus to check the image data before sending.

As described above, in the simple-functional application illustrated in FIG. 4, a part of the job settings (functions) is limited compared to the multi-functional application illustrated in FIG. 3. It is sufficient if the setting value of the job setting limited in the simple-functional application, for example, is "no setting" or is an initial value of the multi-functional application. An initial value of the multi-functional application is a default value of the multi-functional application at the time at which the image processing apparatus 100 is delivered from a factory. It is not possible to change the setting value of the job setting limited in the simple-functional application.

(Example of Menu Screen)

FIG. 5 illustrates an example of the menu screen displayed on the operation unit 1009.

The application display area 410 of the menu screen 400 displays the buttons 411 to 414 for selecting an application. As will be described below, by pressing any one of the displayed buttons 411 to 414, a user can select a job to be executed and select whether to use a multi-functional application or a simple-functional application (that is, many setting items or few setting items, see FIG. 3 and FIG. 4).

Furthermore, in the present embodiment, the menu screen 400 also has a role as a screen for selecting a job history including the predetermined information. The predetermined information is information to specify an application which has executed a job from among the application group 1410, as described above.

The menu screen 400 is displayed on the operation unit 1009 of the image processing apparatus 100. When executing a predetermined job by using the image processing apparatus 100, a user can select an application for executing the job using the menu screen 400. Furthermore, a user can select the predetermined job using a job history on the menu screen 400 and execute the job. In the present embodiment, selectable applications and a job history for executing the predetermined job are displayed on the menu screen 400, that is, one screen.

The application display area 410 is an area that displays the buttons 411 to 414 for selecting the applications 1411 to 1414 (see FIG. 2) to execute jobs as described above.

As described above, the image processing apparatus 100 of the present embodiment includes the copy multi-functional application 1411 and the copy simple-functional application 1412 as applications for executing the "copy" job. As a button for performing the copy multi-functional application 1411, a copy multi-functional application button 411 is displayed. On the other hand, as a button for performing the copy simple-functional application 1412, a copy simple-functional application button 413 is displayed.

Furthermore, the image processing apparatus 100 of the present embodiment includes a multi-functional application (the scan-and-send multi-functional application 1413) and a simple-functional application (the scan-and-send simple-functional application 1414) as applications for executing the "scan and send" job. As a button for performing the scan-and-send multi-functional application 1413, a send multi-functional application button 412 is displayed. On the other hand, as a button for performing the scan-and-send simple-functional application 1414, a send simple-functional application button 414 is displayed.

When a user presses the copy multi-functional application button 411, a screen to be displayed on the operation unit 1009 is transitioned from the menu screen 400 illustrated in FIG. 5 to a job setting screen for the copy multi-functional application 1411 illustrated in FIG. 2.

Furthermore, when a user presses the send multi-functional application button 412, a screen to be displayed on the operation unit 1009 is transitioned from the menu screen 400 to a job setting screen (see FIG. 3) for the scan-and-send multi-functional application 1413 of FIG. 2.

When a user presses the copy simple-functional application button 413, a screen to be displayed on the operation unit 1009 is transitioned from the menu screen 400 to a job setting screen for the copy simple-functional application 1412 of FIG. 2.

When a user presses the send simple-functional application button 414, a screen to be displayed on the operation unit 1009 is transitioned from the menu screen 400 to a job setting screen (see FIG. 4) for the scan-and-send simple-functional application 1414 of FIG. 2.

The job history display area 420 is an area where histories 421 of jobs executed by the applications 1411 to 1414 are displayed. That is, the job histories 421 displayed in the job history display area 420 correspond to history information of the jobs executed by operating the buttons 411 to 414 displayed in the application display area 410.

The number of job histories 421 displayed on the menu screen 400 is arbitrary, but is 5 in FIG. 5.

The information displayed as the job histories 421, for example, is determined on the basis of the job history information table 500 illustrated in FIG. 6. The job history information table 500, for example, corresponds to information associated with a user who is logging in to the image processing apparatus 100. Accordingly, as described above, the job history information management table 1402, for example, includes the job history information table 500 related to at least one job previously executed by the currently logged-in user.

(Example of Job History Information Table)

FIG. 6 illustrates an example of the job history information table 500 corresponding to one job history 421.

Each job history 421 displayed in the job history display area 420 always corresponds to one job history information table in the present embodiment.

Hereinafter, an example of the job history information table 500 generated on the basis of the "scan and send" job executed by the scan-and-send simple-functional application 1414 will be described. The job history information table 500 is stored in the HDD 1004 of the image processing apparatus 100, or an external storage device connected via the network I/F 1008.

As described above, the job history information table 500 includes all history information associated with one job.

A Key 501 indicates information for specifying the job history 421 corresponding to the job history information table 500. In a field 502, a predetermined value is recorded as a value of the key 501.

A job.type 503 indicates the type of an executed job. In a recording field of the job.type 503, for example, "send" is recorded. The "send" indicates that the type of the job is the "scan and send" job.

In the job.type 503, if the types of a job to have been executed are the same, the same information is recorded regardless of whether an application to have been used is the multi-functional application or the simple-functional application. In the case of the "scan and send" job, regardless of whether the job is executed by the scan-and-send multi-functional application 1413 or the scan-and-send simple-functional application 1414, the "send" is recorded in the job.type 503.

A job.date 504 indicates the date and time at which a job related to the job history 421 has been executed. The job.date 504 is displayed in a date information display area 422 to be described below.

A job.application 505 indicates a name of an application having executed the job related to the job history 421. The job.application 505 is displayed in application information display areas 423 and 424 to be described below.

Reference numerals 506 to 511 indicate setting content (job settings) at the time of the execution of the job related to the job history 421.

The job.data.color 506 indicates the color setting of the "scan and send" job. In the present example, the color setting indicates full color.

The job.data.filetype 507 indicates the file format of image data generated in the "scan and send" job. In the present example, the setting of the file format indicates pdf.

The job.data.destination[0] 508 and the job.data.destination[1] 509 indicate the send destinations of the "scan and send" job, respectively. In the present example, the send destination is set to 2. However, the number of settings of the send destination is not limited to 2.

The job.data.scanplex 510 indicates the setting of a one-sided document or a both-sided document of the "scan and send" job. In the present example, the setting of one-sided document or both-sided document is a one-sided document.

The job.data.resolution 511 indicates the resolution setting of the "scan and send" job. In the present example, the setting value of the resolution is 300×300 dpi.

If the "scan and send" job is executed by the scan-and-send simple-functional application 1414, a user is not able to perform the setting related to, for example, the resolution as apparent from the job setting screen of FIG. 4. In such a case, the content of the resolution setting of the job history information table 500 is "no setting" or an initial value (a default value).

In the present embodiment, an item which is not settable by the simple-functional application is also recorded in the job history information table 500. That is, if the simple-functional application is used to execute jobs, for example, the setting of resolution by a user is not performed, but a default value or a value indicating "no-setting" is recorded in the job history information table 500. Consequently, setting items included in the job history information table 500 are the same for both the multi-functional application and the simple-functional application. In other words, it can be said that the setting content of the jobs depends on the type of the job, not on whether it is a multi-functional application or a simple-functional application. The setting content at the time of execution of these jobs is displayed in a setting content display area 425 to be described below.

The setting items recorded in the job history information table 500 are not limited to the reference numerals 506 to 511 illustrated in FIG. 6. For example, the number of setting items can be increased or decreased according to the type of a job.

Returning to the description of FIG. 5, the date information display area 422 is an area for displaying date information obtained by referring to the job history information table 500 corresponding to the job history 421. The date information is information indicating the date and time at which a job has been executed.

The application information display areas 423 and 424 are areas for displaying application information obtained by referring to the job history information table 500 corresponding to the job history 421. The application information is information indicating the type of an application having executed a job.

For example, in the application information display area 423, "send" is displayed. The "send" indicates that the job history 421 is the history of a job executed by the scan-and-send multi-functional application 1413. Furthermore, in the application information display area 424, "send (simple)" is displayed. The "send (simple)" indicates that the job history 421 is the history of a job executed by the scan-and-send simple-functional application 1414.

As described above, in each job history 421, the application information display areas 423 and 424 perform display capable of specifying whether a job has been executed by the multi-functional application or the simple-functional application. This is not limited to the "scan and send" job.

The setting content display area 425 is an area for displaying setting contents obtained by referring to the job history information table 500 corresponding to the job history 421. The setting contents include a setting value (a job setting) for executing a job, for example, a color setting, a magnification setting, a both-side setting, and the like.

In the setting content display area 425, for example, the color setting is a full color, the magnification setting is 100%, the both-side setting is one side, and the send type is E-MAIL. As items to be displayed in the setting content display area 425, information that is characteristic to the job is selected from the history information recorded in the job history information table 500 and is displayed. The information that is characteristic to the job, for example, is determined by the image processing apparatus 100.

Furthermore, it is desired that the items to be displayed in the setting content display area 425 are determined in advance according to the type of a job. For example, in the "scan and send" job, the display of the color setting, the magnification setting, the both-side setting, and the send type in the setting content display area 425 are determined in advance. The items to be displayed are not limited thereto, and other items may be displayed or all items may be displayed.

In the case where the job history 421 is the history of jobs executed by the scan-and-send simple-functional application 1414, the items to be displayed in the setting content display area 425 may include setting content not settable by a user, for example, the resolution setting and the like. In contrast, in such a case, the items to be displayed in the setting content display area 425 may include only setting content settable by a user, for example, the setting of the file format, the color setting and the like.

For the same job, setting items to be displayed as a job history 421 related to a job executed by the multi-functional application and setting items to be displayed as a job history 421 related to a job executed by the simple-functional application may be the same as each other or different from each other. In the latter case, for example, the number of setting items to be displayed as the job history 421 related to the job executed by the simple-functional application may be smaller than that of the setting items to be displayed as the job history 421 related to the job executed by the multi-functional application.

(Creation of Job History)

Figure 7:
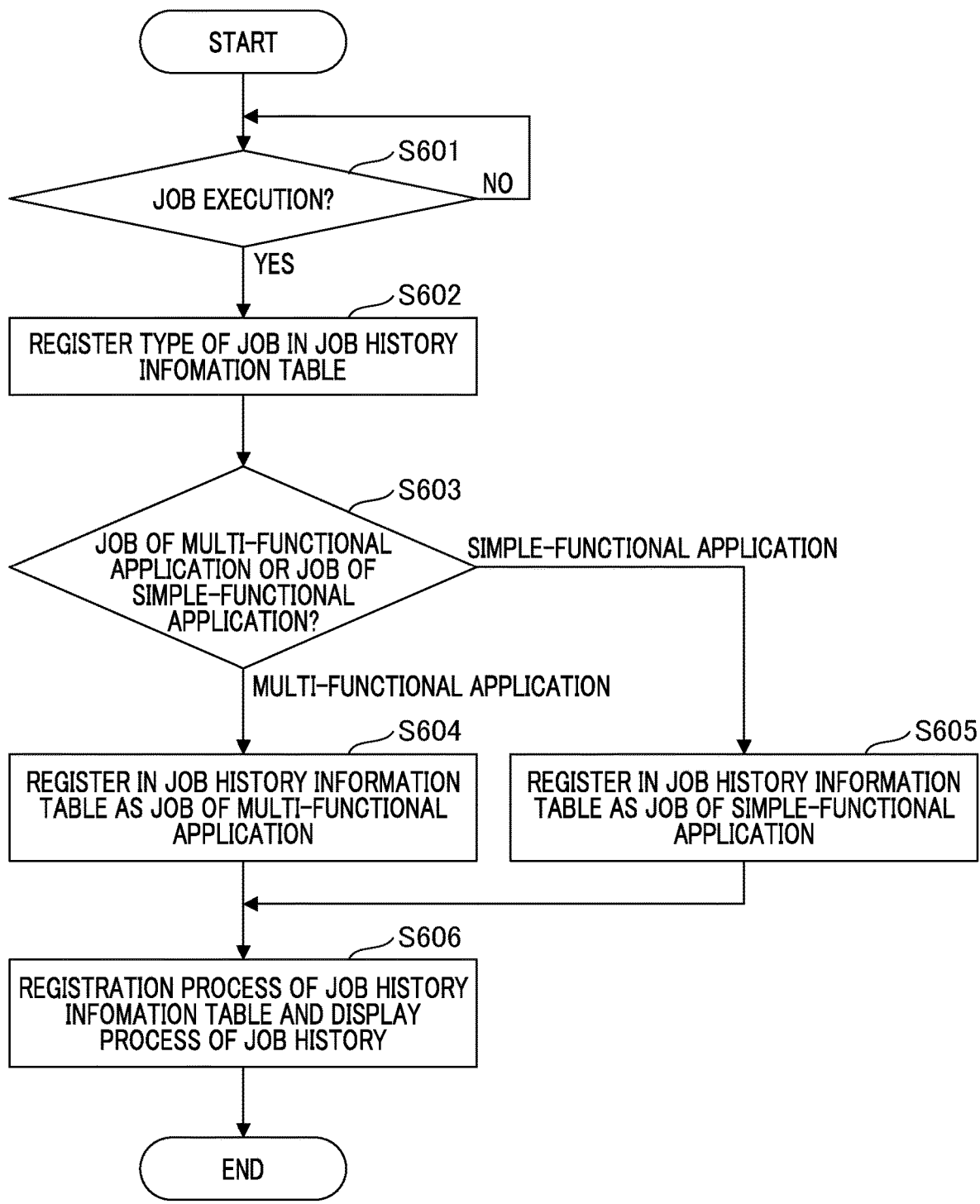
FIG. 7 is a flowchart showing processes from the execution of a job to the creation of a job history.

FIG. 7 illustrates a flowchart from the execution of a job to the creation of a job history.

Each step illustrated in FIG. 7 is processed when the CPU 1001 of the image processing apparatus 100 executes programs. The programs to be executed correspond to the job history management unit 1401 and the menu function unit 1405 in the software configuration of FIG. 2. The programs are called from the ROM 1002 to the CPU 1001, and then are executed by the CPU 1001.

Firstly, in S601, the job history management unit 1401 determines whether a job has been executed. If the job history management unit 1401 determines that the job has been executed, the procedure proceeds to S602. If the job history management unit 1401 determines that the job has not been executed, the procedure stays in S601 and waits for the execution of the job.

Next, in S602, the job history management unit 1401 generates the job history information table 500 on the basis of information on the job executed in S601, for example, the type of the job, the setting content of the job, a used application (the multi-functional application or the simple-functional application), and the like. For example, in the job history information table 500 of FIG. 6, the job history management unit 1401 registers the type of the job executed in S601 as the job.type 503. When the job history information table 500 is generated, the procedure proceeds to S603.

Next, in S603, the job history management unit 1401 determines whether the job has been executed by the multi-functional application or the simple-functional application, by using an application identifier corresponding to the application having executed the job. That is, the application identifier includes information for specifying whether the job has been executed by the multi-functional application or the simple-functional application. Accordingly, on the basis of the application identifier, the job history management unit 1401 can determine whether the job has been executed by the multi-functional application or the simple-functional application.

As described above, in S603, the job history management unit 1401 performs determination regarding whether the executed job is a job executed by the multi-functional application or a job executed by the simple-functional application. This step is a step in which, even though setting content for the same job ("copy", "scan and send", and the like) is the same, when applications having executed the job are different from each other, the job history management unit 1401 manages the jobs as different job histories. That is, even though the setting content is the same, the job history management unit 1401 separately manages the history of the job executed by the multi-functional application and the history of the job executed by the simple-functional application.

If the job history management unit 1401 determines that the job has been executed by the multi-functional application, the procedure proceeds to S604. On the other hand, if the job history management unit 1401 determines that the job has been executed by the simple-functional application, the procedure proceeds to S605.

In S604, the job history management unit 1401 registers the application name of the multi-functional application as the application name 505 in the job history information table 500. For example, the job history management unit 1401 adds, as the application name 505, a character string indicating the execution of the job by the multi-functional application to the head of a character string of the job.type 503 registered in S602. Specifically, in the case of the "scan and send" job executed by the multi-functional application, the application name 505 is multiple_send.

On the other hand, in S605, the job history management unit 1401 registers the application name of the simple-functional application as the application name 505 in the job history information table 500. For example, the job history management unit 1401 adds, as the application name 505, a character string indicating the execution of the job by the simple-functional application to the head of the character string of the job.type 503 registered in S602. Specifically, in the case of the "scan and send" job executed by the simple-functional application, the application name 505 is simple_send.

In relation to the application name 505, the character string to be added, that is, the character string indicating the execution of the job by the multi-functional application or the character string indicating the execution of the job by the simple-functional application may be added to the end of the character string of the job.type 503 registered in S602. Furthermore, the character string to be added may be the application identifier corresponding to the application determined to execute the job in S603.

When S604 or S605 is ended, the procedure proceeds to S606.

In S606, the job history management unit 1401 registers all necessary information in the job history information table 500. Then, the menu function unit 1405 displays the job history 421 based on the information of the job history information table 500 in the job history display area 420.

As described above, according to the procedure of FIG. 7, when the applications having executed the job are different from each other, the job history management unit 1401 individually creates the job history information table 500 for the applications even though the setting content for the same job ("copy", "scan and send", and the like) is the same. Accordingly, in S606, on the basis of the information of the job history information table 500, the menu function unit 1405 can separately display the job history 421 related to the multi-functional application and the job history 421 related to the simple-functional application even though the setting content is the same.

In the control of an information processing apparatus in the related art, there are no steps S603 to S605 described above, and so only one job history (the job history information table 500) is created regardless of whether the job has been executed by the multi-functional application or the simple-functional application when the setting content for the same job is the same. Originally, in the related art, in relation to information on an application having executed a job, information itself regarding whether the job has been executed by the multi-functional application or the simple-functional application is not displayed as a job history.

Accordingly, according to the procedure of FIG. 7, it is possible to improve the convenience of users who desire to execute a job by using the job history 421 for each stage, as compared to the related art.

(Example of Executing Job from Job History)

In the present embodiment, as described above, if it is possible to execute the same job by selectively using one of the multi-functional application and the simple-functional application, the job history 421 including information regarding whether the job has been executed by which one of these applications is created. Accordingly, the job history 421 including the information is displayed on the operation unit 1009, so that it is possible to improve the convenience of users who desire to execute the job from the job history 421.

Therefore, the CPU 1001 of the control unit 1000 includes a management unit that manages a job history having information regarding whether a job has been executed by which one of the multi-functional application and the simple-functional application if the job has been executed. For example, the management unit manages the aforementioned job history information table 500.

Furthermore, the CPU 1001 includes a first display unit that displays the menu screen 400 including the job history 421 having the information on the operation unit 1009 in a state in which the job history 421 can be selected. For example, the first display unit controls the display of the menu screen 400 on the basis of the menu function unit 1405 in the software configuration of FIG. 2.

The first display unit may display an application selection button for selecting whether to execute the same job by using the multi-functional application or the simple-functional application, on the operation unit 1009 together with the job history 421. The application selection button corresponds to the copy multi-functional application button 411, the send multi-functional application button 412, the copy simple-functional application button 413, and the send simple-functional application button 414.

Furthermore, the CPU 1001 includes a selection unit (not illustrated) that selects one of the multi-functional application and the simple-functional application on the basis of the information if the job history 421 having the information is selected on the menu screen 400. For example, the selection unit selects one of the multi-functional application and the simple-functional application on the basis of the aforementioned application identifier.

If the job history 421 having the information is selected on the menu screen 400 and the information indicates the multi-functional application, the selection unit selects the multi-functional application in principle. Furthermore, if the job history 421 having the information is selected on the menu screen 400 and the information indicates the simple-functional application, the selection unit selects the simple-functional application in principle.

Furthermore, the CPU 1001 includes a second display unit (not illustrated) that displays the job setting screen (see FIG. 3 or FIG. 4) on the operation unit 1009 by using one of the multi-functional application and the simple-functional application, which has been selected by the selection unit. For example, the second display unit controls the display of the menu screen 400 on the basis of the menu function unit 1405 in the software configuration of FIG. 2.

Furthermore, the CPU 1001 may also include a third display unit (not illustrated) that makes the operation unit 1009 display a confirmation screen for confirming which one of the multi-functional application and the simple-functional application to select if the job history 421 having the information is selected and the information indicates the simple-functional application. For example, the third display unit displays the confirmation screen on the operation unit 1009 as a dialog box (window) as will be described below. In such a case, the aforementioned selection unit selects, as an exception, the multi-functional application or the simple-functional application selected by using the confirmation screen.

Furthermore, the third display unit may display the confirmation screen for confirming which one of the multi-functional application and the simple-functional application to select by using the operation unit 1009 if the job history 421 having the information is pressed and the press time is longer than a threshold value. In such a case, the third display unit may display a context menu on the operation unit 1009, and if a user selects "confirmation screen display" in the context menu, display the confirmation screen on the operation unit 1009.

FIG. 8 illustrates an example of a screen displayed on the operation unit on the basis of the selection of a job history.

FIG. 8 is a screen flow diagram corresponding to S901 to S904 of the flowcharts of FIG. 10A to be described below.

A screen 710 corresponds to the menu screen 400 of FIG. 5. When a job history 711 is pressed (i.e. selected) on the screen 710, the screen 710 is transitioned to a screen 720. The job history 711 indicates a job history if the "scan and send" job has been executed by the scan-and-send multi-functional application 1413. The screen 720 corresponds to a screen example by the multi-functional application illustrated in FIG. 3. When the screen 710 is transitioned to the screen 720, the setting content of a job at that time point is the same as that registered in the job history information table 500 corresponding to the job history 711.

Furthermore, when a job history 712 is pressed (i.e. selected) on the screen 710, the screen 710 is transitioned to a screen 730. The job history 712 is a job history if the "scan and send" job has been executed by the scan-and-send simple-functional application 1414. The screen 730 corresponds to a screen example by the simple-functional application illustrated in FIG. 4. When the screen 710 is transitioned to the screen 730, the setting content of a job at that time point is the same as that registered in the job history information table 500 associated with the job history 712.

FIG. 9 illustrates an example of displaying a screen for confirming an application that performs a job setting after the selection of a job history.

FIG. 9 is a screen flow diagram corresponding to S1001 to S1005 of the flowcharts of FIG. 10B to be described below.

In the example of FIG. 8, when the job history 711 is pressed, the screen 710 is unconditionally transitioned to the screen 720 using the multi-functional application, and when the job history 712 is pressed, the screen 710 is unconditionally transitioned to the screen 730 using the simple-functional application. However, depending on a user, for example, it is also considered that a case of performing a detailed job setting with minimum effort is provided by performing a more detailed setting on the basis of the setting content of a job executed by the simple-functional application.

In such a case, in order to improve user's convenience, it is also desired to display a screen (dialog) for confirming an application that performs a job setting if the job history 711 or 712 is pressed.

Accordingly, in an example described hereinafter with reference to FIG. 9, a screen (dialog) for confirming an application that performs a job setting is displayed if the job history 712 related to a job executed using the simple-functional application is pressed (i.e. selected).

A screen selection dialog 801 is a dialog box (window) displayed after the job history 712 is pressed.

A multi-functional application selection button 802 is a button for making a transition to a screen for performing a job setting using the multi-functional application. The button is displayed as a thumbnail of a screen using the multi-functional application in order to allow a user to recognize a screen image after the transition.

On the other hand, a simple-functional application selection button 803 is a button for making a transition to a screen for performing a job setting using the simple-functional application. The button is also displayed as a thumbnail of a screen using the simple-functional application in order to allow a user to recognize a screen image after the transition.

In the example of FIG. 9, the job history 712 is a job history related to the "scan and send" job. Accordingly, the number of thumbnails displayed on the screen selection dialog 801 is 2, that is, the job setting screen by the scan-and-send multi-functional application 1413 (see FIG. 3) and the job setting screen by the scan-and-send simple-functional application 1414 (see FIG. 4).

Figure 10B:
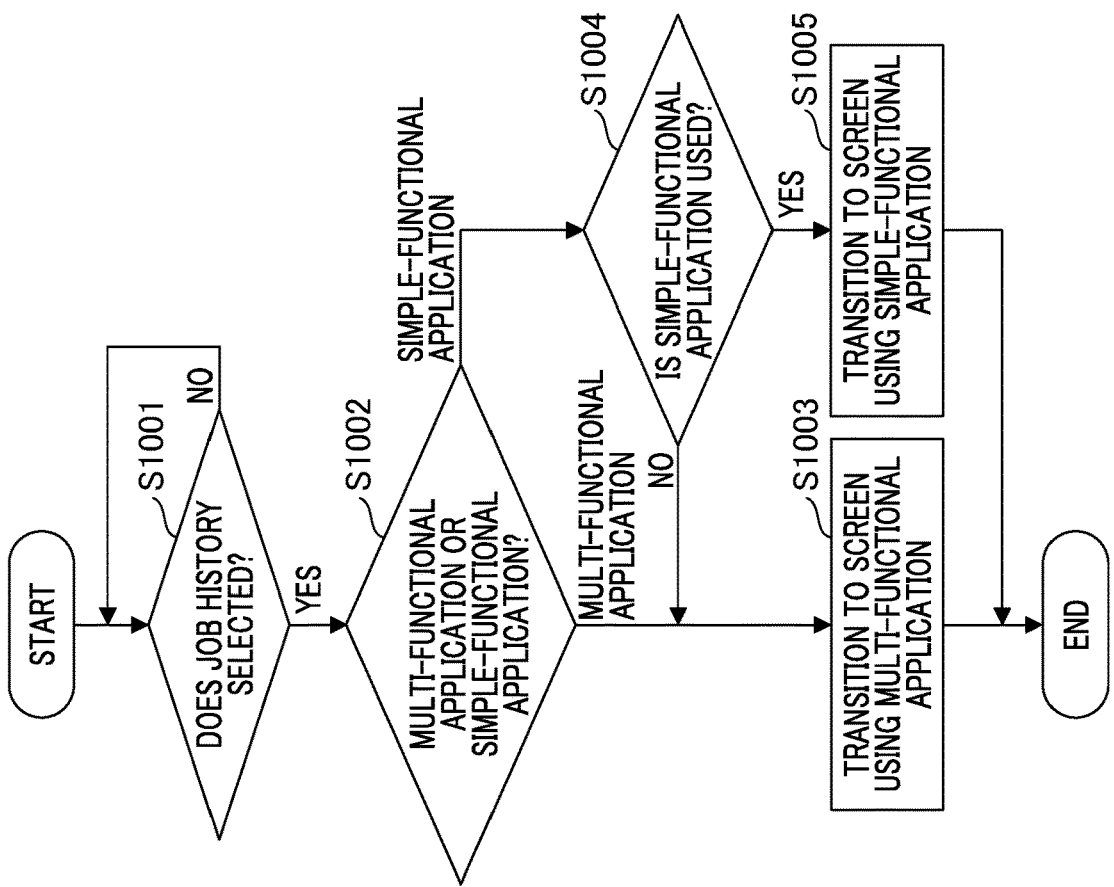
FIG. 10A and FIG. 10B are flowcharts showing processes to determine an application that performs a job setting from a job history.
Figure 10A:
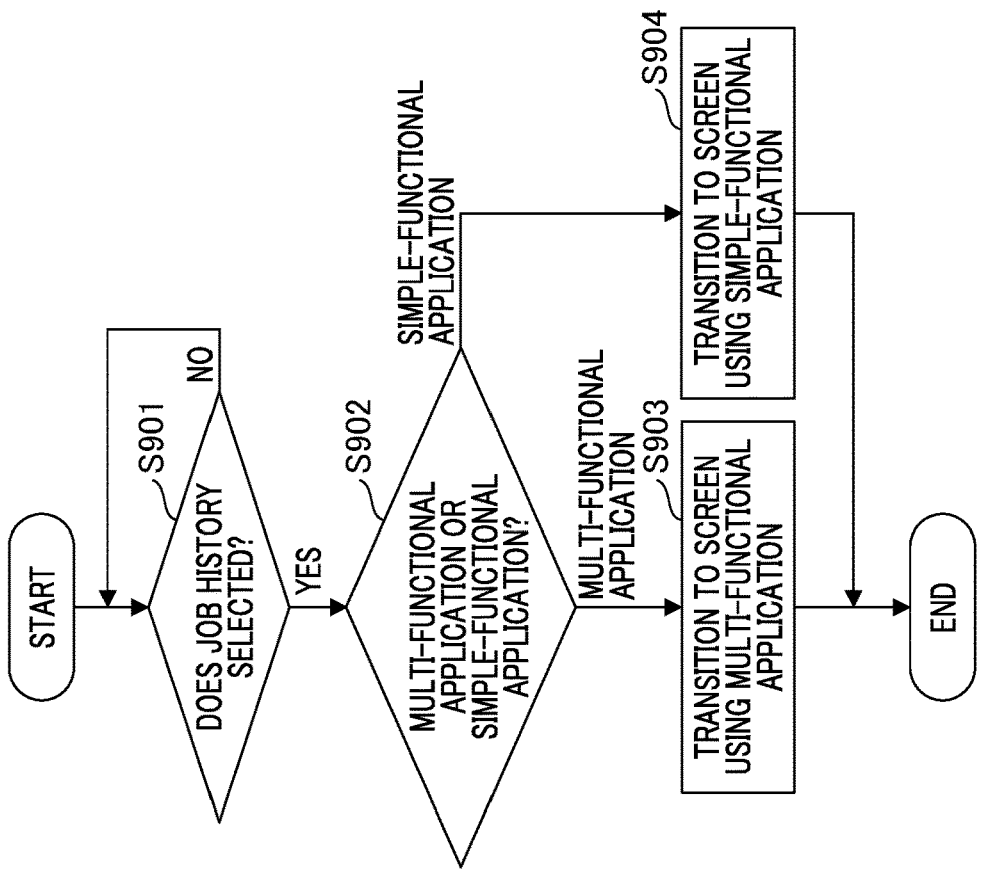

FIGS. 10A and 10B illustrate flowcharts that determine applications for performing jobs setting from job histories.

FIG. 10A corresponds to the example of FIG. 8 and FIG. 10B corresponds to the example of FIG. 9. Each step of FIG. 10A and FIG. 10B is processed when the CPU 1001 of the image processing apparatus 100 executes a program. The program to be executed corresponds to the menu function unit 1405 in the software configuration of FIG. 2. The program is called from the ROM 1002 to the CPU 1001, and then is executed by the CPU 1001.

The flowchart of FIG. 10A will be described.

Firstly, in S901, the menu function unit 1405 determines whether a job history in a menu screen (the screen 710) has been pressed (i.e. selected). If the menu function unit 1405 determines that the job history has been pressed, the procedure proceeds to S902. If the menu function unit 1405 determines that the job history has not been pressed, the procedure stays in S901 and waits for the pressing of the job history.

Next, in S902, the menu function unit 1405 determines whether the pressed job history is the history of a job executed by the multi-functional application or the history of a job executed by the simple-functional application, with reference to the job history information table 500. This step is based on the processes to create different job histories (S603 to S606) if the setting content of the job history is the same but the job has been executed by different applications.

The menu function unit 1405 refers, for example, the application name 505 of the job history information table 500 to determine whether the pressed job history is the history of the job executed by the multi-functional application or the history of the job executed by the simple-functional application. If the pressed job history is the history of the job executed by the multi-functional application, the procedure proceeds to S903. If the pressed job history is the history of the job executed by the simple-functional application, the procedure proceeds to S904.

Next, in S903, the menu function unit 1405 displays a job setting screen based on the multi-functional application on the operation unit 1009. Then, a user confirms the setting content of the job setting screen, and instructs to continue the execution of a job when there is no change in the setting content. In contrast, when there are some setting contents desired to be changed, the user can change the setting contents using the job setting screen followed by an instruction to execute a job.

On the other hand, in S904, the menu function unit 1405 displays a job setting screen based on the simple-functional application on the operation unit 1009. Then, a user confirms the setting content of the job setting screen, and instructs to continue the execution of a job when there is no change in the setting content. In contrast, when there are some setting contents desired to be changed, the user can change the setting contents using the job setting screen followed by an instruction to execute a job.

The execution instruction of the job, for example, can be performed when the user presses an execution button (not illustrated) of the image processing apparatus 100. If a job execution command by the user is received, the execution unit of the CPU 1001 executes the job.

The flowchart of FIG. 10B will be described.

Firstly, in S1001, the menu function unit 1405 determines whether a job history in a menu screen (the screen 710) has been pressed (i.e. selected). If the menu function unit 1405 determines that the job history has been pressed, the procedure proceeds to S1002. If the menu function unit 1405 determines that the job history has not been pressed, the procedure stays in S1001 and waits for the pressing of the job history.

Next, in S1002, the menu function unit 1405 determines whether the pressed job history is the history of a job executed by the multi-functional application or the history of a job executed by the simple-functional application, with reference to the job history information table 500. This step is based on the processes to create different job histories (S603 to S606) if the setting content of the job history is the same but the job has been executed by different applications.

The menu function unit 1405 refers, for example, the application name 505 of the job history information table 500 to determine whether the pressed job history is the history of the job executed by the multi-functional application or the history of the job executed by the simple-functional application. If the pressed job history is the history of the job executed by the multi-functional application, the procedure proceeds to S1003. If the pressed job history is the history of the job executed by the simple-functional application, the procedure proceeds to S1004.

In S1004, the menu function unit 1405 displays the screen selection dialog 801 illustrated in FIG. 9 on the operation unit 1009, and allows a user to confirm whether to execute the job using the multi-functional application or the simple-functional application. If the user selects the multi-functional application in the screen selection dialog 801, that is, if the multi-functional application selection button 802 is pressed, the menu function unit 1405 proceeds the procedure to S1003. In contrast, if the user selects the simple-functional application, that is, if the simple-functional application selection button 803 is pressed, the menu function unit 1405 proceeds the procedure to S1005.

In S1003, the menu function unit 1405 displays a job setting screen based on the multi-functional application on the operation unit 1009. Then, a user confirms the setting content of the job setting screen, and instructs to continue the execution of a job when there is no change in the setting content. In contrast, when there are some setting contents desired to be changed, the user can change the setting contents using the job setting screen followed by an instruction to execute a job.

On the other hand, in S1005, the menu function unit 1405 displays a job setting screen based on the simple-functional application on the operation unit 1009. Then, a user confirms the setting content of the job setting screen, and instructs to continue the execution of a job when there is no change in the setting content. In contrast, when there are some setting contents desired to be changed, the user can change the setting contents using the job setting screen followed by an instruction to execute a job.

The execution instruction of the job, for example, can be performed when the user presses the execution button (not illustrated) of the image processing apparatus 100. If a job execution command by the user is received, the execution unit of the CPU 1001 executes the job.

If the procedure proceeds from S1004 to S1003, the setting content of the job history related to the simple-functional application pressed in S1001 is assumed to be transferred to the screen by the multi-functional application displayed in S1003.

Step S1006 (not illustrated) described below may be newly added between S1002 and S1004.

In a case the step S1006 is added, if the job history selected in S1001 is the history of the job executed by the simple-functional application, the procedure proceeds to S1006. In S1006, it is confirmed whether the press time of the job history is longer than a threshold value (for example, several seconds).

If the press time of the job history is longer than the threshold value, the procedure proceeds to S1004. If the press time of the job history is shorter than the threshold value, the procedure proceeds to S1005. In contrast, if the press time of the job history is longer than the threshold value in S1006, the context menu may be displayed on the operation unit 1009. Then, if a user selects the "confirmation screen display" in the context menu, the procedure can also proceed to S1004.

As described above, if S1006 is added, a user can perform a more detailed job setting on the basis of the history of a job using the simple-functional application by long-pressing of the job history if the user desires. Furthermore, when the press time of the job history is short, the user can execute a job by using the history of the job using the simple-functional application as is.

(Example of Displaying Job History on Menu Screen Using Button)

When a job history to be frequently used among the job histories 421 displayed in the job history display area 420 is registered as an application button of the application display area 410, it is expected to further improve user's convenience.

Accordingly, an example of displaying the job histories on the menu screen using buttons will be described below.

In the present embodiment, an application button related to the job history is called a job history button. In order to display the job history buttons in the application display area 410, the CPU 1001 has a registration unit (not illustrated). If a button registration is received, the registration unit performs the button registration related to a job history including information regarding whether a used application is the multi-functional application or the simple-functional application. In such a case, the first display unit of the CPU 1001 displays a menu screen including the job history buttons on the operation unit 1009 in a state in which the job history buttons can be selected.

Furthermore, as will be described below, when the job history button is registered, the first display unit adds a mark indicating the new registration of the job history button to the job history button. Then, the first display unit deletes the mark from the job history button or after a predetermined number of jobs are executed after a predetermined time passes from the registration of the job history button. In this way, a user easily recognizes the newly registered job history button, so that user's convenience is further improved.

Furthermore, if the job history button is selected, the second display unit of the CPU 1001 displays a job setting screen on the operation unit 1009 by using the multi-functional application or the simple-functional application corresponding to the job history button. Preferably, in order to improve user's convenience, the job history button includes the application name in order to distinguish the multi-functional application or the simple-functional application.

Figure 11:
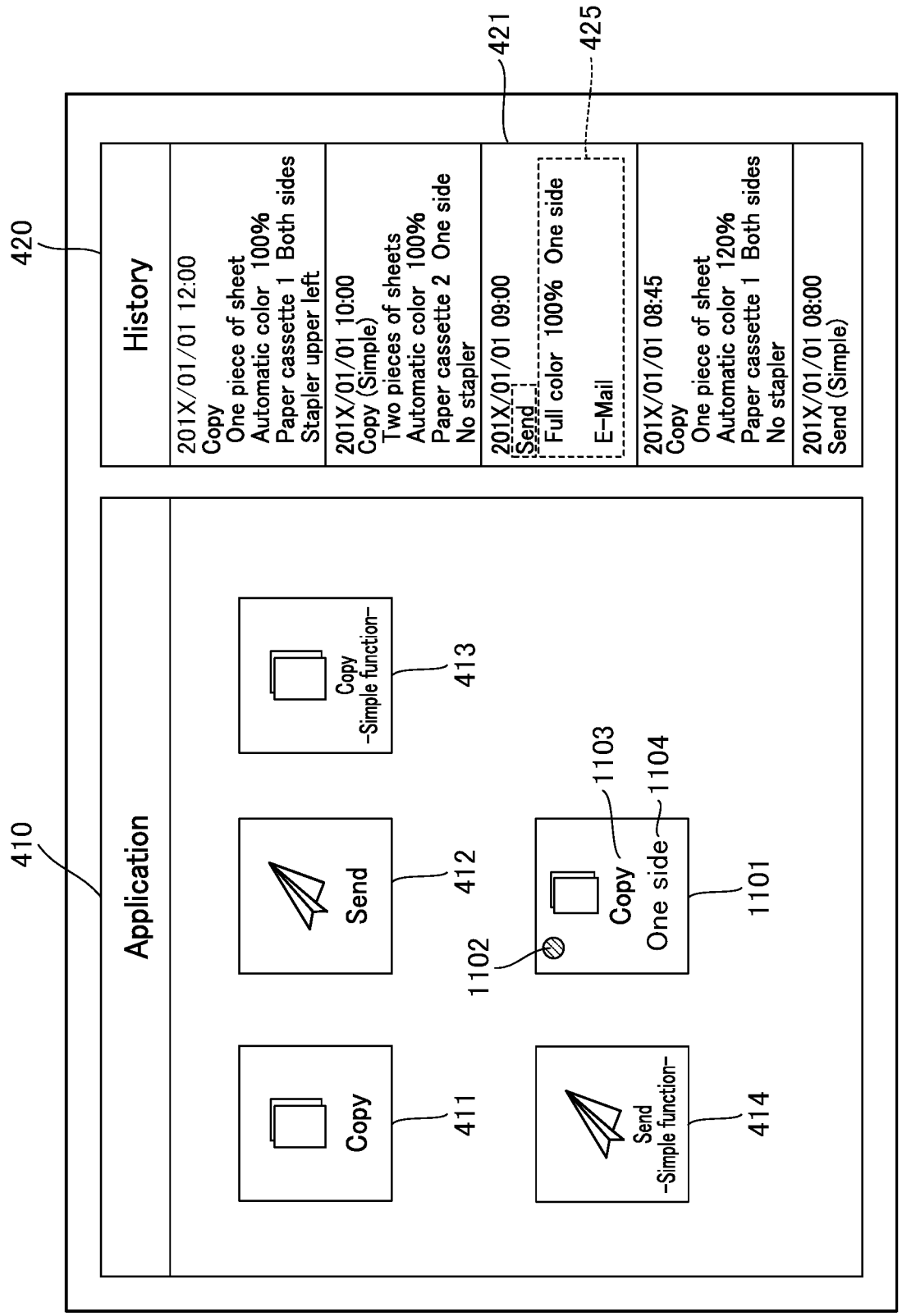
FIG. 11 is a diagram illustrating an example of displaying job histories on a menu screen by using button displays.

FIG. 11 illustrates an example of displaying a job history on the menu screen using a button.

An application button 1101 is a button corresponding to the job history having the setting content displayed in the setting content display area 425. The application button 1101 is displayed in the application display area 410 on the basis of a button registration instruction from a user.

The button registration instruction from a user can be made in various methods.

For example, if a user presses a screen area displaying the job history 421 in the job history display area 420 during a period longer than the threshold value (e.g. several seconds), the CPU 1001 displays the context menu in the menu screen of the operation unit 1009. Then, if the user selects the "button registration" in the context menu, the CPU 1001 recognizes that there is an instruction of the button registration.

When the application button 1101 is pressed (i.e. selected), an application (the multi-functional application or the simple-functional application) related to the job history corresponding to the button displays a job setting screen having the setting content of the job history on the operation unit 1009.

A new application button notification 1102 is a mark for allowing a user to recognize that the application button 1101 has been newly created and registered. The shape of the mark is not particularly limited. As illustrated in FIG. 11, the shape of the mark may be a circular shape, or other arbitrary shapes, for example, a rectangular shape, a diamond shape and the like. Furthermore, the mark can also be replaced with a letter, a character and the like.

The new application button notification 1102 is deleted after a predetermined time passes or after a predetermined number of jobs are executed from the registration of the application button 1101, for the aforementioned purpose.

On the application button 1101, an application name 1103 is displayed. The application name 1103, for example, is the application name 505 in the job history information table 500. Alternatively, at the time of the registration of the application button 1101, a user can be allowed to determine an arbitrary application name.

Preferably, the application button 1101 can be easily distinguished by a user from the application buttons 411 to 414 initially displayed as a default in the application display area 410. Therefore, for example, the font size of the application name 1103 is made smaller than that of the application name displayed on the application buttons 411 to 414. However, it may be possible to allow a user to easily recognize the distinction between the application button 1101 and the application buttons 411 to 414 by methods other than the above method.

An application comment 1104 is a comment that is displayed on the application button 1101. For example, at the time of the registration of the application button 1101, a user can be allowed to input an arbitrary application comment 1104. Furthermore, the main content of the setting content of the job history corresponding to the application button 1101 may also be displayed as the application comment 1104 automatically or on the basis of user's selection.

In FIG. 11, the application comment 1104 is one of the setting content of the job history corresponding to the application button 1101, and is displayed as "one side" in order to allow a user to recognize at first sight that the setting content is "scanning of one-side document".

Figure 12:
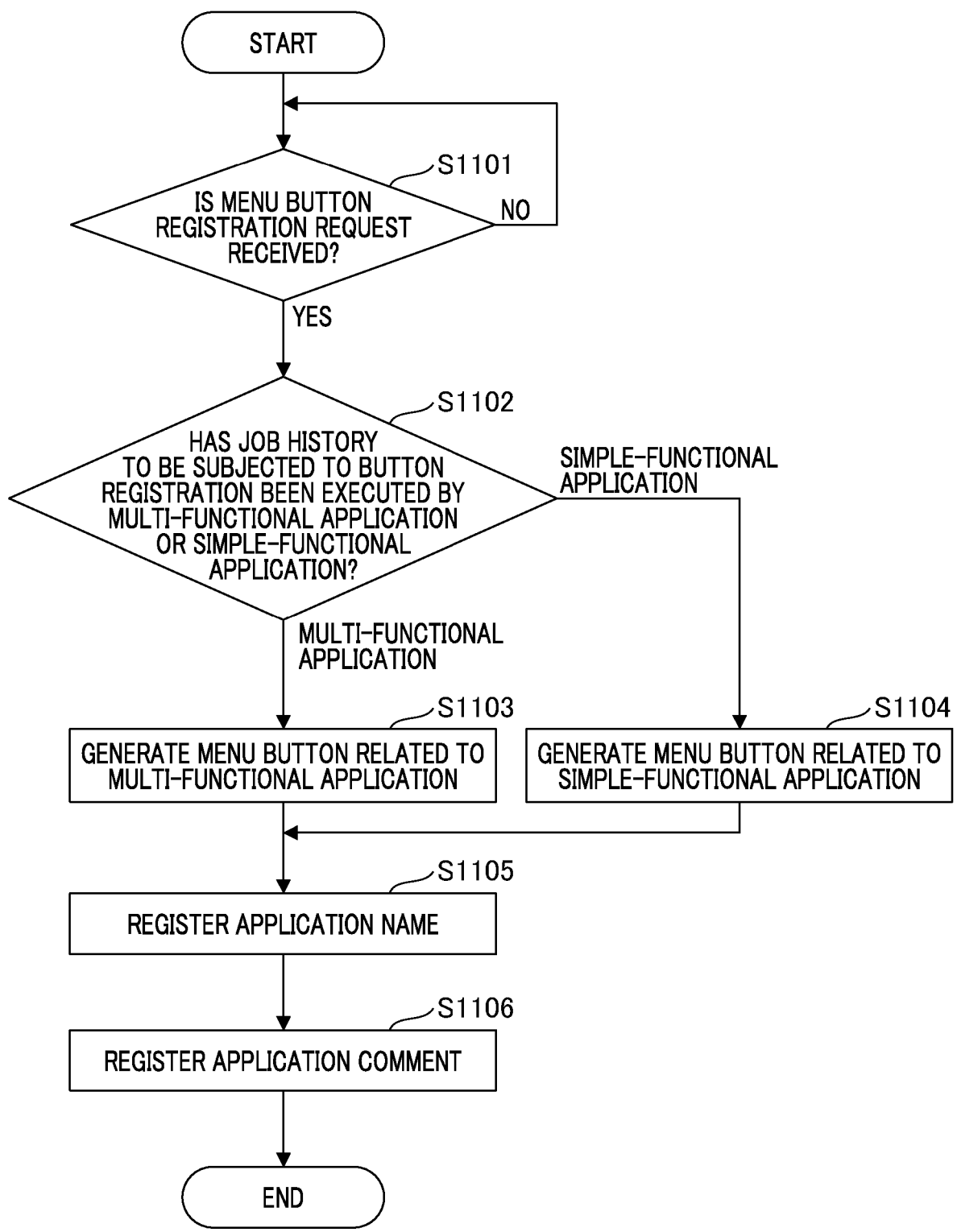
FIG. 12 is a flowchart showing procedure to register job histories on a menu screen by using button displays.

FIG. 12 illustrates a flowchart indicating a procedure for registering a job history on the menu screen using a button.

Each step illustrated in FIG. 12 is processed when the CPU 1001 of the image processing apparatus 100 executes a program. The program to be executed is the menu function unit 1405 in the software configuration of FIG. 2. The program is called from the ROM 1002 to the CPU 1001, and then is executed by the CPU 1001.

Firstly, in S1101, the menu function unit 1405 determines whether a menu button registration request is received. As described above, the menu button registration request, for example, can be made using the context menu displayed after a user long-presses the job history 421 (during a period longer than the threshold value). However, the method of the menu button registration request is not limited thereto.

When the menu function unit 1405 determines that the menu button registration request is received, the procedure proceeds to S1102. On the other hand, when the menu function unit 1405 determines that the menu button registration request is not received, the procedure stays in S1101 and waits for the menu button registration request.

In S1102, the menu function unit 1405 determines whether a job history to be subjected to the button registration has been executed by the multi-functional application or the simple-functional application. The determination in this step is performed in the menu function unit 1405 by referring to the application name 505 of the job history information table 500 corresponding to the job history to be subjected to the button registration.

If the menu function unit 1405 determines that the job history to be subjected to the button registration has been executed by the multi-functional application, the procedure proceeds to S1103. On the other hand, if the menu function unit 1405 determines that the job history to be subjected to the button registration has been executed by the simple-functional application, the procedure proceeds to S1104.

In S1103, the menu function unit 1405 recognizes that the job history to be subjected to the button registration has been executed by the multi-functional application, and generates an application button 1101 related to the multi-functional application. Specifically, the menu function unit 1405 generates the application button 1101 for executing a job by using the multi-functional application.

On the other hand, in S1104, the menu function unit 1405 recognizes that the job history to be subjected to the button registration has been executed by the simple-functional application, and generates an application button 1101 related to the simple-functional application. Specifically, the menu function unit 1405 generates the application button 1101 for executing a job by using the simple-functional application.

After S1103 and S1104 are ended, the procedure proceeds to S1105.

In S1105, the menu function unit 1405 registers an application name 1103 to be added to the application button 1101 generated in S1103 or S1104. For example, the application name 1103 is determined when the menu function unit 1405 requests a user to input the application name 1103 and the user inputs the application name 1103.

In the case the menu function unit 1405 requests the user to input the application name 1103 but there is no input from the user during a predetermined period of time, the menu function unit 1405 automatically determines the application name 1103. For example, in such a case, the menu function unit 1405 registers the application name 505 in the job history information table 500 as the application name 1103 to be added to the application button 1101.

Next, in S1106, the menu function unit 1405 registers an application comment 1104 to be added to the application button 1101 generated in S1103 or S1104. For example, the application comment 1104 is determined when the menu function unit 1405 requests the user to input the application comment 1104 and the user inputs the application comment 1104.

In the case the menu function unit 1405 promotes the user to input the application comment 1104 but there is no input from the user during a predetermined period of time, the menu function unit 1405 registers that there is no application comment 1104. In such a case, the menu function unit 1405 sets the application comment 1104 of the application button 1101 generated in S1103 or S1104 as a blank field.

Then, the procedure is ended.

After the procedure is ended, the menu function unit 1405 displays the application button 1101 registered by the procedure in the application display area 410. If the user presses the application button 1101, the menu function unit 1405 displays the job setting screen by the scan-and-send multi-functional application 1413 (see FIG. 3) or the job setting screen by the scan-and-send simple-functional application 1414 (see FIG. 4) on the display of the operation unit 1009.

Other Embodiments

The aforementioned embodiment is also implemented by performing the following process. That is, the aforementioned embodiment is also achieved by supplying a software (program) to perform the functions of the aforementioned embodiment to the system or the apparatus via a network or various storage media and making a computer (or a CPU or an MPU) of the system or the apparatus read and execute the program. In such a case, the computer program and the storage media storing the computer program constitute each element of the aforementioned embodiment.

In the aforementioned embodiment, the following modification can be made.

Figure 13:
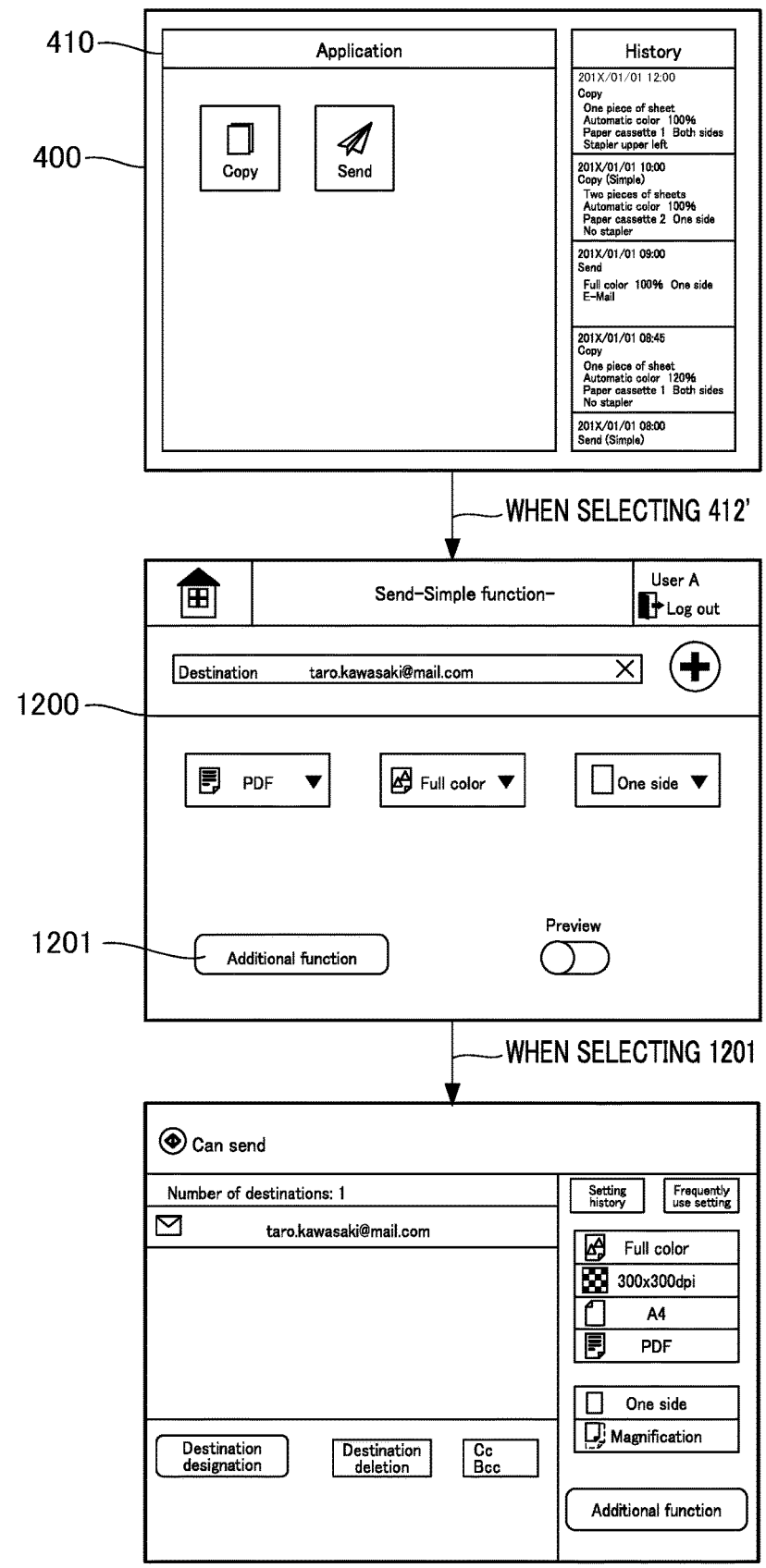
FIG. 13 is a diagram for explaining another embodiment.

For example, as illustrated in FIG. 13, on the menu screen 400, job selection buttons related to a job executable in the image processing apparatus 100, for example, a copy button 411' and a scan-and-send button 412' are displayed in the application display area 410.

In this modification example, these job selection buttons 411' and 412' are not buttons for selecting an application (the multi-functional application or the simple-functional application) and simply serve as buttons for selecting the type of a job. When these job selection buttons 411' and 412' are pressed (i.e. selected), the menu screen 400 is transitioned to a job setting screen using the simple-functional application.

For example, when the scan-and-send button 412' is pressed, a job setting screen 1200 of the scan-and-send simple-functional application 1414 is displayed on the display of the operation unit 1009. The job setting screen 1200, for example, is different from the job setting screen of FIG. 4 in that an "additional function" button 1201 is added.

That is, a user can perform a job setting again using a job setting screen displayed by the multi-functional application if pressing the additional function button 1201. For example, in the job setting screen 1200, when the additional function button 1201 is pressed on the job setting screen 1200, the job setting screen (FIG. 3) of the scan-and-send multi-functional application 1413 is displayed on the display of the operation unit 1009.

In the present modification example, after the job execution, the application name 505 of the job history information table 500 is rewritten to a name of an application (the multi-functional application or the simple-functional application) having finally executed the job.

Furthermore, in the present modification example, the first and second display units in the aforementioned embodiment have the following functions.

The first display unit displays the menu screen 400 including the job selection buttons 411' and 412' on the operation unit 1009 in a state in which the job selection buttons 411' and 412' can be selected. The second display unit displays the job setting screen 1200 of the simple-functional application on the operation unit 1009 if the job selection buttons 411' and 412' are selected on the menu screen 400. In addition, the second display unit displays the job setting screen of the multi-functional application on the operation unit 1009 again if the predetermined button (e.g. additional function button) 1201 on the job setting screen 1200 is selected.

Also, this modification example has an effect of improving user's convenience.

Furthermore, in the aforementioned embodiment, the following modification can also be made.

Figure 14:
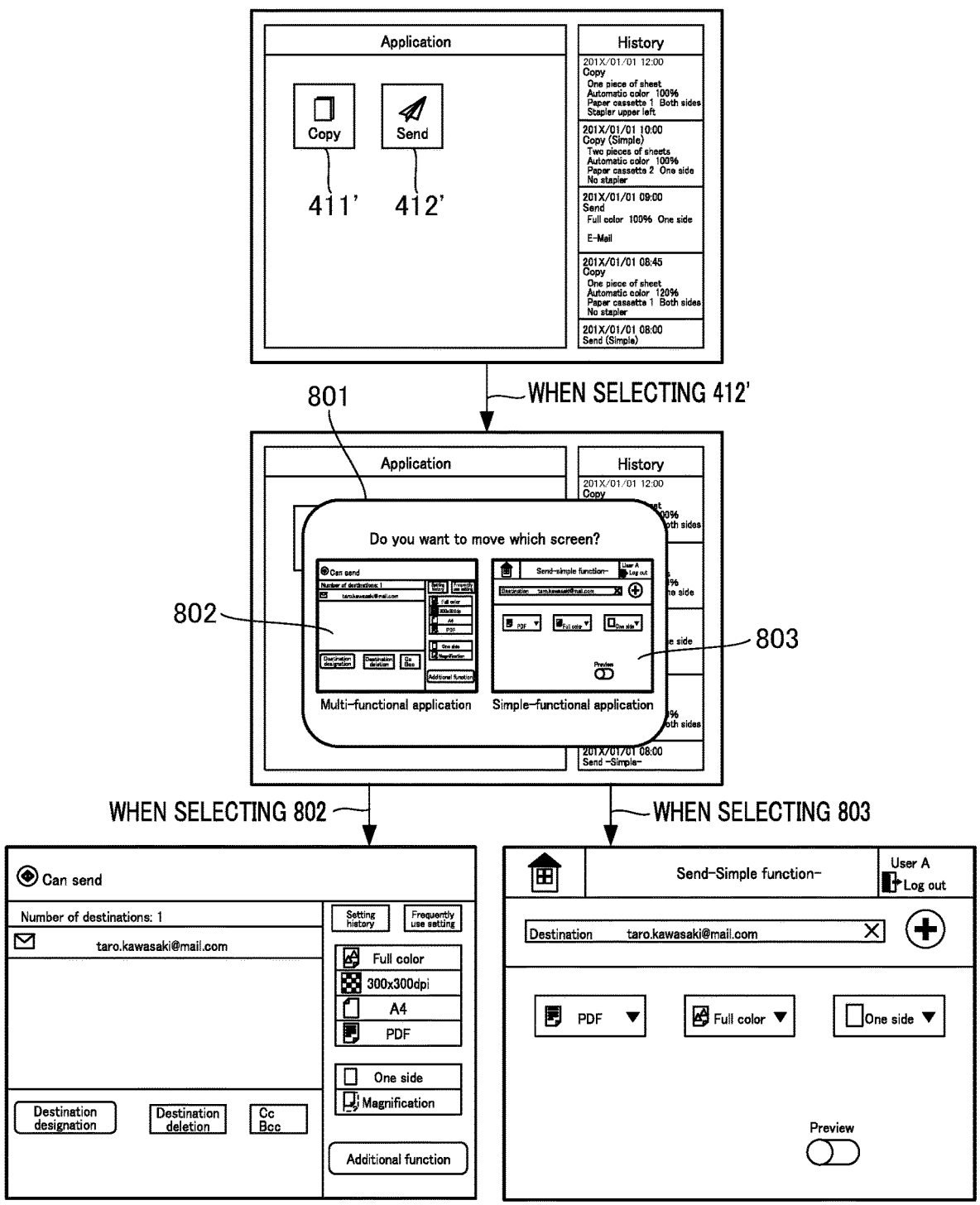
FIG. 14 is a diagram for explaining another embodiment.

For example, as illustrated in FIG. 14, on the menu screen 400, job selection buttons related to a job executable in the image processing apparatus 100, for example, a copy button 411' and a scan-and-send button 412' are displayed in the application display area 410.

Also in this modification example, these job selection buttons 411' and 412' are not buttons for selecting an application (the multi-functional application or the simple-functional application) and simply serve as buttons for selecting the type of a job. When these job selection buttons 411' and 412' are pressed (i.e. selected), a screen selection dialog 801 (equal to that of FIG. 9) for selecting whether to use the multi-functional application or the simple-functional application is displayed.

For example, when the scan-and-send button 412' is pressed, a multi-functional application selection button 802 for selecting a job setting using the multi-functional application and a simple-functional application selection button 803 for selecting a job setting using the simple-functional application are displayed. Accordingly, a user can select one of the job setting screen (FIG. 3) using the multi-functional application and the job setting screen (FIG. 4) using the simple-functional application by selecting one of the multi-functional application selection button 802 and the simple-functional application selection button 803.

In the present modification example, after the job execution, the application name 505 of the job history information table 500 is rewritten to a name of an application (the multi-functional application or the simple-functional application) having finally executed the job. Alternatively, the application name 505 after the job execution may be a blank field or information indicating the job execution according to the present modification example. In such a case, the job execution from the job history 421 corresponds to a flow in which the screen selection dialog 801 is displayed after the job history 421 is pressed.

Furthermore, in the present modification example, the control unit and the first and second display units in the aforementioned embodiment have the following functions.

The first display unit displays the menu screen 400 including the job selection buttons 411' and 412' on the operation unit 1009 in a state in which the job selection buttons 411' and 412' can be selected. The control unit includes a third display unit that displays, on the operation unit 1009, a confirmation screen (the screen selection dialog 801) for confirming which one of the multi-functional application and the simple-functional application to select if the job selection buttons 411' and 412' are selected on the menu screen 400. The second display unit displays a job setting screen on the operation unit 1009 by using the multi-functional application or the simple-functional application selected on the confirmation screen.

Also, this modification example has an effect of improving user's convenience.

CONCLUSION

As described above, according to the present invention, in an information processing apparatus capable of executing the same job by selectively using at least two applications, information indicating an application having executed a job is included in a job history, so that it is possible to the convenience of users who desire to execute a job from the job hi story.

For example, in a case of performing a job setting of a job such as copy and scan-and-send, if the aforementioned embodiment is applied to a MFP capable of selecting one of the multi-functional application and the simple-functional application, the CPU records information indicating an application having executed a job in the job history. As a consequence, if executing the job from the job history, a user can confirm whether the job has been executed by the multi-functional application or the simple-functional application, on the basis of the job history. Accordingly, the user can appropriately select the copy job called by the user from the job history. Consequently, according to the present invention, it is possible to improve the convenience of users who desire to execute a job from the job history.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-139575, filed Jul. 25, 2018, which is hereby incorporated by reference herein in its entirety.

What is claimed is:

1. An information processing apparatus comprising:
an operation unit receiving an operation of a user;
a memory storing instructions; and
a processor executing the instructions causing the information processing apparatus to:
control the operation unit to selectively display a first application's job setting screen for performing a setting and instructing a job execution of a first type job and a second application's job setting screen for performing a setting and instructing a job execution of the first type job,
manage application selection information indicating the first application or the second application, if a predetermined job that is the first type job has been executed;
control the operation unit to display a plurality of job histories and receive designation of any of the job histories by the user;
wherein at least two types of job histories, a first type job history of the first type job and a second type job history of a second type job having a job type different from that of the first type job, are displayed in a job history region within a screen each time the job is executed;
the job history region can simultaneously display at least the two types of job histories which are the first type job history and the second type job history;
specify whether the application selection information included in the designated job history is the first application or the second application after designation of a job history of the predetermined job that is the first type job by the user from the job history region in the screen; and
control the operation unit to display the first application's job setting screen or the second application's job setting screen, which corresponds to the specified application.

2. The information processing apparatus according to claim 1, wherein, the processor further executing the instructions causing the information processing apparatus to:
register a job history button corresponding to a received button registration, if the operation unit receives button registration of the job history having information regarding the application selection information from the user; and
control the operation unit to display the job history button and receive designation of the displayed job history button from the user.

3. The information processing apparatus according to claim 2, wherein, the processor further executes the instructions causing the information processing apparatus to:
add a mark indicating new registration of the job history button to the job history button, when the job history button is registered; and delete the mark from the job history button after a predetermined time passes or after a predetermined number of jobs are executed from the registration of the job history button.

4. The information processing apparatus according to claim 2, wherein, the processor further executes the instructions causing the information processing apparatus to display the job setting screen on the operation unit by using the first application or the second application, which corresponds to the job history button, if the job history button is selected on the menu screen.

5. The information processing apparatus according to claim 2, wherein:
the operation unit includes a display having a touch panel function, and
the processor further executes the instructions causing the information processing apparatus to:
display the menu screen and the first and second application's job setting screen on the display;
display a context menu on the menu screen if a pressing operation of a job history having information regarding the application selection information is performed on the menu screen and a time of the pressing operation is longer than a threshold value; and
receive the button registration if the button registration is selected in the context menu.

6. The information processing apparatus according to claim 2, wherein:
the job history button includes at least one of an application name of the first application or the second application and an application comment; and
the processor further executes the instructions causing the information processing apparatus to display a screen for requesting a user to input the application name and the application comment on the operation unit.

7. The information processing apparatus according to claim 1, wherein, the processor further executes the instructions causing the information processing apparatus to:
select the first application, if the application selection information included in the job history information selected on the menu screen indicates the first application; and
select the second application, if the application selection information included in the job history information selected on the menu screen indicates the second application.

8. The information processing apparatus according to claim 1, wherein the processor further executes the instructions causing the information processing apparatus to:
display a confirmation screen for confirming whether to select the first application or the second application on the operation unit if the application selection information included in the job history information selected on the menu screen indicates the second application; and
select the first application or the second application selected on the confirmation screen.

9. The information processing apparatus according to claim 1, wherein:
the operation unit includes a display having a touch panel function; and
the processor further executes the instructions causing the information processing apparatus to:
display the menu screen and the first and second application's job setting screen on the display;
display a confirmation screen for confirming which one of the first application and the second application to select on the operation unit if a pressing operation of the job history having information regarding the application selection information is performed on the menu screen and a time of the pressing operation is longer than a threshold value; and
select the first application or the second application selected on the confirmation screen.

10. The information processing apparatus according to claim 1, wherein the processor further executes the instructions causing the information processing apparatus to:
control the operation unit to display the menu screen including a job selection button and receive selection of the job selection button by the user,
display the second application's job setting screen corresponding to the second application on the operation unit, if the job selection button is selected on the menu screen, and
display the first application's job setting screen corresponding to the first application on the operation unit, if a predetermined button is selected on the second application's job setting screen.

11. The information processing apparatus according to claim 1, wherein the processor further executes the instructions causing the information processing apparatus to:
control the operation unit to display the menu screen including a job selection button and receive selection of the job selection button by the user;
display a confirmation screen to confirm which one of the first application and the second application to select on the operation unit, if the job selection button is selected on the menu screen; and
control the operation unit to display the first application's job setting screen corresponding to the first application selected on the confirmation screen or the second application's job setting screen corresponding to the second application selected on the confirmation screen.

12. The information processing apparatus according to claim 1, wherein the processor further executes the instructions causing the information processing apparatus to:
display a plurality of job setting items on the first application's job setting screen if the first application is specified; and
display only some of the plurality of job setting items on the second application's job setting screen if the second application is specified.

13. The information processing apparatus according to claim 1, wherein, the processer further executes the instructions causing the information processing apparatus to execute the job, if a job execution command by the user is received from the user.

14. The information processing apparatus according to claim 1, wherein the processor further executes the instructions causing the information processing apparatus to:
control the operation unit to display a first application selection button for executing the predetermined job by using the first application and a second application selection button for executing the predetermined job by using the second application, and receive selection of the first or second application selection button by the user.

15. The information processing apparatus according to claim 14, wherein the processor further executes the instructions causing the information processing apparatus to:
display the first application's job setting screen of the first application corresponding to the first application selection button on the operation unit, if the first application selection button is selected on the menu screen; and display the second application's job setting screen of the second application corresponding to the second application selection button on the operation unit, if the second application selection button is selected on the menu screen.

16. The information processing apparatus according to claim 1, wherein the predetermined job is a job of copying a document or a job of scanning a document and sending a data created by scanning the document.

17. The information processing apparatus according to claim 1, further comprising a storage unit storing a job history having the information as a management table.

18. The information processing apparatus according to claim 1, wherein the job history displayed on the menu screen includes an application name of the first application or the second application.

19. A control method for an information processing apparatus which is an image forming apparatus comprising an operation unit receiving an operation of a user, and a control unit making the operation unit selectively display a first application's job setting screen for performing a setting and instructing a job execution of a first type job and a second application's job setting screen for performing a setting and instructing a job execution of the first type job, the method comprising:

managing an application selection information indicating the first application or the second application, if a predetermined job that is the first type job has been executed;

controlling the operation unit to display a plurality of job histories and receive designation of any of the job histories by the user;

at least two types of job histories, a first type job history of the first type job and a second type job history of a second type job having a job type different from that of the first type job, are displayed in a job history region within a screen each time the job is executed;

the job history region can simultaneously display at least the two types of job histories which are the first type job history and the second type job history;

specifying whether the application selection information included in the designated job history is the first application or the second application after designation of a job history of the predetermined job that is the first type job by the user from the job history region in the screen; and controlling the operation unit to display the first application's job setting screen or the second application's job setting screen, which corresponds to the specified application.

20. A non-transitory computer-readable storage medium on which is stored a computer program for making a computer execute a control method in an information processing apparatus which comprises an operation unit receiving an operation of a user, and a control unit making the operation unit selectively display a first application's job setting screen for performing a setting and instructing a job execution of a first type job and a second application's job setting screen for performing a setting and instructing a job execution of the first type, the method comprising:

managing an application selection information indicating the first application or the second application, if a predetermined job that is the first type job has been executed;

controlling the operation unit to display a plurality of job histories and receive designation of any of the job histories by the user;

wherein at least two types of job histories, a first type job history of the first type job and a second type job history of a second type job having a job type different from that of the first type job, are displayed in a job history region within a screen each time the job is executed;

the job history region can simultaneously display at least the two types of job histories which are the first type job history and the second type job history;

specifying whether the application selection information included in the designated job history is the first application or the second application after designation of a job history of the predetermined job that is the first type job by the user from the job history region in the screen; and controlling the operation unit to display the first application's job setting screen or the second application's job setting screen, which corresponds to the specified application.

* * * * *